(12) United States Patent
Zhang et al.

(10) Patent No.: US 12,489,297 B2
(45) Date of Patent: Dec. 2, 2025

(54) PHOTOVOLTAIC SYSTEM, POWER SUPPLY SYSTEM, AND CONTROL METHOD

(71) Applicant: Huawei Digital Power Technologies Co., Ltd., Shenzhen (CN)

(72) Inventors: Yanzhong Zhang, Shanghai (CN); Hongmiao Fang, Shanghai (CN); Bo Yu, Shanghai (CN); Jinxiang Zhan, Shanghai (CN); Tiansan Lin, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 306 days.

(21) Appl. No.: 18/345,556

(22) Filed: Jun. 30, 2023

(65) Prior Publication Data
US 2023/0344239 A1  Oct. 26, 2023

Related U.S. Application Data

(63) Continuation of application No. PCT/CN2020/142039, filed on Dec. 31, 2020.

(51) Int. Cl.
  *H02J 3/38* (2006.01)
  *H02M 1/36* (2007.01)
  *H02M 7/5387* (2007.01)

(52) U.S. Cl.
  CPC .............. *H02J 3/381* (2013.01); *H02M 1/36* (2013.01); *H02M 7/53871* (2013.01); *H02J 2300/24* (2020.01)

(58) Field of Classification Search
  CPC ........ H02M 1/009; H02M 3/158; H02M 1/36; H02M 7/53871; H02J 3/381; H02J 2300/24
  See application file for complete search history.

(56) References Cited

U.S. PATENT DOCUMENTS

| | | | |
|---|---|---|---|
| 2012/0019964 A1* | 1/2012 | West | H02H 7/205 361/42 |
| 2012/0039003 A1* | 2/2012 | West | H10F 77/955 361/42 |

FOREIGN PATENT DOCUMENTS

| | | | |
|---|---|---|---|
| CN | 101785174 B | | 12/2012 |
| CN | 104949246 A | | 9/2015 |
| CN | 105406516 A | | 3/2016 |
| CN | 105591609 A | | 5/2016 |
| CN | 104218609 B | * | 8/2016 |
| CN | 104242349 B | | 9/2016 |
| CN | 206099366 U | | 4/2017 |
| CN | 206164112 U | | 5/2017 |

* cited by examiner

Primary Examiner — Alex Torres-Rivera
Assistant Examiner — Ularislao Cordova
(74) Attorney, Agent, or Firm — Maier & Maier, PLLC

(57) ABSTRACT

A first input end of a first inverter is connected to a second end of a direct current positive bus, and a second input end of the first inverter is connected to a second end of a neutral bus. A first input end of a second inverter is connected to the second end of the neutral bus, and a second input end of the second inverter is connected to a second end of a direct current negative bus. A controller is configured to control, in startup and shutdown processes, a voltage to ground of the direct current positive bus, a voltage to ground of the direct current negative bus, and a voltage to ground of the neutral bus each to be less than or equal to a preset voltage threshold, to ensure personal safety and device safety.

20 Claims, 21 Drawing Sheets

PHOTOVOLTAIC SYSTEM, POWER SUPPLY SYSTEM, AND CONTROL METHOD

CROSS-REFERENCE TO RELATED APPLICATIONS

This application is a continuation of International application No. PCT/CN2020/142039, filed on Dec. 31, 2020, the disclosure of which is hereby incorporated by reference in its entirety.

TECHNICAL FIELD

The embodiments relate to the field of photovoltaic power generation technologies and to a photovoltaic system, a power supply system, and a control method.

BACKGROUND

Currently, photovoltaic power generation gets more attention, and voltage levels are increasingly high. Photovoltaic power generation is that a photovoltaic array outputs a direct current, and an inverter converts the direct current into an alternating current to connect to a grid or provide to a load.

A direct current bus in a conventional photovoltaic system includes a direct current positive bus and a direct current negative bus. To be specific, a positive input end of the inverter is connected to the direct current positive bus, and a negative input end of the inverter is connected to the direct current negative bus. A voltage between the direct current positive bus and the direct current negative bus serves as an input voltage to the inverter. A voltage level of the whole photovoltaic system is a maximum voltage between a voltage of the direct current positive bus and a voltage of the direct current negative bus. Production compliance is also designed based on this voltage level.

To meet a production compliance standard, it is required that the input voltage of the inverter, namely, a voltage on a direct current side, cannot exceed a production compliance requirement. Otherwise, harm to personnel and a device may be caused. In particular, for power components inside the inverter, each power component has a corresponding withstand voltage requirement. If a voltage exceeds a withstand voltage of the power component, the power component may be breakdown and damaged. A higher voltage level of the photovoltaic system is a new challenge for the withstand voltage of the power component, and selection of the power component becomes more difficult.

SUMMARY

The embodiments provide a photovoltaic system, a power supply system, and a control method, to improve a bus voltage and a power level without improving a production compliance requirement and a withstand voltage of a power component.

An embodiment provides a photovoltaic system, including a controller and two inverters: a first inverter and a second inverter, and further including the following three direct current buses: a direct current positive bus, a neutral bus, and a direct current negative bus. A first end of each of the three direct current buses is connected to a photovoltaic array; a first input end and a second input end of the first inverter are respectively connected to a second end of the direct current positive bus and a second end of the neutral bus; and a first input end and a second input end of the second inverter are respectively connected to the second end of the neutral bus and a second end of the direct current negative bus. To meet a production compliance requirement and avoid an overvoltage, a controller controls, in startup and shutdown processes of the photovoltaic system, a voltage to ground of the direct current positive bus, a voltage to ground of the direct current negative bus, and a voltage to ground of the neutral bus each to be less than or equal to a preset voltage threshold. For example, the controller may control a turn-on sequence of each device in the photovoltaic system during startup, and the controller may control a shutdown sequence of each device in the photovoltaic system during shutdown, to ensure no overvoltage, and further meet the production compliance requirement. It should be understood that the neutral bus in this embodiment may be an actual open wire, or the open wire may not exist, provided that it is ensured that a potential difference between locations at which the photovoltaic array and the inverter are connected to the neutral bus is within a preset voltage range. A startup sequence is not limited in this embodiment. For example, a device of a positive half bus is first turned on, and then a device corresponding to a negative half bus is turned on, and vice versa. During shutdown, the device of the positive half bus may be first turned off, and then the device of the negative half bus may be turned off, and vice versa.

The photovoltaic system provided in this embodiment includes the two inverters and the three direct current buses. Therefore, although a voltage level of the photovoltaic system is high, a production compliance may be set according to half of the voltage level, that is, a low production compliance voltage may meet a requirement. However, because the production compliance voltage is low, and a bus voltage of the photovoltaic system is high, an improper operation is more likely to cause an overvoltage, that is, exceeding a requirement of the production compliance voltage, consequently causing damage to a photovoltaic device. Therefore, when the photovoltaic system is started and shut down, a sequence of each device needs to be strictly controlled, to ensure that the voltages to ground of the three direct current buses do not exceed the preset voltage threshold, to further meet the production compliance requirement.

In an implementation, the photovoltaic system may further include a power converter and a voltage regulation circuit. An input end of the power converter is connected to the photovoltaic array, a first output end of the power converter is connected to the first end of the direct current positive bus, a second output end of the power converter is connected to the first end of the neutral bus, and a third output end of the power converter is connected to the first end of the direct current negative bus. A specific location of the voltage regulation circuit is not limited in this embodiment. The voltage regulation circuit is connected to any one of the following locations: between the neutral bus and the ground, between the direct current positive bus and the ground, between the direct current negative bus and the ground, between an output end of the first inverter and the ground, between an output end of the second inverter and the ground, or between the input end of the power converter and the ground. For example, the power converter may include a boost circuit, and the voltage regulation circuit may include an anti-potential induced degradation (PID) circuit. For example, a common case is that the voltage regulation circuit may be connected between the neutral bus and the ground.

In an implementation, to generate a positive bus voltage and a negative bus voltage, an implementation of the power converter is to include a direct current/direct current conversion circuit and a negative voltage generation circuit; an input end of the direct current/direct current conversion circuit is configured to connect to the photovoltaic array, a first output end of the direct current/direct current conversion circuit is connected to the first end of the direct current positive bus, and a second output end of the direct current/direct current conversion circuit is connected to the first end of the neutral bus; a first input end of the negative voltage generation circuit is connected to the first output end of the direct current/direct current conversion circuit, a second input end of the negative voltage generation circuit is connected to the second output end of the direct current/direct current conversion circuit, a first output end of the negative voltage generation circuit is connected to the first end of the neutral bus, and a second output end of the negative voltage generation circuit is connected to the first end of the direct current negative bus; and the negative voltage generation circuit is configured to convert an output voltage of the direct current/direct current conversion circuit into a negative voltage for output.

The following describes three startup time sequences of the photovoltaic system when the power converter includes the direct current/direct current conversion circuit and the negative voltage generation circuit:

In a first startup time sequence, in the startup process, the controller controls the direct current/direct current conversion circuit and the first inverter to first turn on, then controls the voltage regulation circuit to turn on, and finally controls the negative voltage generation circuit to turn on and the second inverter to turn on.

In a second startup time sequence, in the startup process, the controller controls the direct current/direct current conversion circuit to turn on, then controls the voltage regulation circuit to turn on, then controls the negative voltage generation circuit to turn on, and finally controls the first inverter and the second inverter to turn on.

In a third startup time sequence, in the startup process, the controller first controls the first inverter to turn on, then controls the voltage regulation circuit to turn on, then controls the second inverter to turn on, and finally controls the negative voltage generation circuit and the direct current/direct current conversion circuit to turn on.

The following describes two shutdown time sequences included when the power converter includes the direct current/direct current conversion circuit and the negative voltage generation circuit:

In a first shutdown time sequence, in the shutdown process, the controller controls the second inverter and the negative voltage generation circuit to turn off, then controls the first inverter and the direct current/direct current conversion circuit to turn off, and finally controls the voltage regulation circuit to turn off.

In a second shutdown time sequence, in the shutdown process, the controller controls the first inverter and the second inverter to turn off, then controls the negative voltage generation circuit and the direct current/direct current conversion circuit to turn off, and finally controls the voltage regulation circuit to turn off.

In an implementation, to generate a positive bus voltage and a negative bus voltage, the power converter may include a direct current/direct current conversion circuit and a positive voltage generation circuit; an input end of the direct current/direct current conversion circuit is configured to connect to the photovoltaic array, a first output end of the direct current/direct current conversion circuit is connected to the first end of the neutral bus, and a second output end of the direct current/direct current conversion circuit is connected to the first end of the direct current negative bus; a first input end of the positive voltage generation circuit is connected to the first output end of the direct current/direct current conversion circuit, a second input end of the positive voltage generation circuit is connected to the second output end of the direct current/direct current conversion circuit, a first output end of the positive voltage generation circuit is connected to the first end of the direct current positive bus, and a second output end of the positive voltage generation circuit is connected to the first end of the neutral bus; and the positive voltage generation circuit converts an output voltage of the direct current/direct current conversion circuit into a positive voltage for output.

The following describes three startup time sequences included when the power converter includes the direct current/direct current conversion circuit and the positive voltage generation circuit:

In a first startup time sequence, in the startup process, the controller first controls the direct current/direct current conversion circuit and the second inverter to turn on, then controls the voltage regulation circuit to turn on, then controls the positive voltage generation circuit to turn on, and finally controls the first inverter to turn on.

In a second startup time sequence, in the startup process, the controller first controls the direct current/direct current conversion circuit to turn on, then controls the voltage regulation circuit to turn on, then controls the positive voltage generation circuit to turn on, and finally controls the first inverter and the second inverter to turn on.

In a third startup time sequence, in the startup process, the controller first controls the first inverter to turn on, then controls the voltage regulation circuit to turn on, then controls the second inverter to turn on, and finally controls the positive voltage generation circuit and the direct current/direct current conversion circuit to turn on.

The following describes two shutdown time sequences included when the power converter includes the direct current/direct current conversion circuit and the positive voltage generation circuit:

In a first shutdown time sequence, in the shutdown process, the controller first controls the first inverter and the positive voltage generation circuit to turn off, then controls the second inverter and the direct current/direct current conversion circuit to turn off, and finally controls the voltage regulation circuit to turn off.

In a second shutdown time sequence, in the shutdown process, the controller first controls the first inverter and the second inverter to turn off, then controls the positive voltage generation circuit and the direct current/direct current conversion circuit to turn off, and finally controls the voltage regulation circuit to turn off.

In this embodiment, in addition to monitoring the voltage to prevent the overvoltage, a magnitude of a ground leakage current of each direct current bus may be further monitored. When the leakage current exceeds a preset limit, the devices also need to be turned off. In addition, the direct current bus may be discharged by using a discharging circuit, to ensure that the voltages to ground of the three direct current buses drop to below the preset voltage threshold within a time required by the production compliance. The photovoltaic array may further include the discharging circuit. The discharging circuit is connected to the direct current positive bus or the direct current negative bus by using a switch. The controller is further configured to: when the voltage to ground of the direct current positive bus, the voltage to ground of the direct current negative bus, or the voltage to ground of the neutral bus is greater than the preset voltage threshold, control the switch to turn on, and control the discharging circuit to discharge. The discharging circuit may be connected to the direct current positive bus BUS+ or the direct current negative bus BUS− by using the switch. In another possible implementation form, there may be no switch, and the discharging circuit may actively perform discharging when the voltage exceeds the preset voltage threshold.

In an implementation, the direct current/direct current conversion circuit in the power converter includes at least a boost conversion circuit, the discharging circuit is connected to the direct current positive bus, and a first isolating switch is further included; the first isolating switch is connected between the boost conversion circuit and the photovoltaic array; and the controller is configured to: when the voltage to ground of the direct current positive bus, the voltage to ground of the direct current negative bus, or the voltage to ground of the neutral bus is greater than the preset voltage threshold, control the first isolating switch to turn off, and control the discharging circuit to discharge the direct current positive bus.

In an implementation, the voltage regulation circuit includes at least an anti-potential induced degradation apparatus.

The foregoing embodiment is described by using an example in which a bipolar photovoltaic system is applied to the photovoltaic system. In addition, the bipolar photovoltaic system may be further applied to bipolar power supplying in any other scenario. For example, an embodiment further provides a power supply system, including a first inverter, a second inverter, and a controller; a first end of a direct current positive bus is configured to connect to a first output end of a direct current power supply, a first end of a neutral bus is configured to connect to a second output end of the direct current power supply, and a first end of a direct current negative bus is configured to connect to a third output end of the direct current power supply; a first input end of the first inverter is connected to a second end of the direct current positive bus, and a second input end of the first inverter is connected to a second end of the neutral bus; a first input end of the second inverter is connected to the second end of the neutral bus, and a second input end of the second inverter is connected to a second end of the direct current negative bus; and the controller is configured to control, in startup and shutdown processes of the power supply system, a voltage to ground of the direct current positive bus, a voltage to ground of the direct current negative bus, and a voltage to ground of the neutral bus each to be less than or equal to a preset voltage threshold.

The foregoing advantages of the photovoltaic system are also applicable to the power supply system provided in this embodiment. Details are not described herein again.

In an implementation, a source of the direct current power supply is any one of the following items: renewable energy and non-renewable energy. The renewable energy includes any one of the following items: wind power generation and hydroelectric power. The non-renewable energy includes an energy storage battery and the like.

In an implementation, the power supply system further includes a voltage regulation circuit; and the voltage regulation circuit is connected to any one of the following locations: between the neutral bus and the ground, between the direct current positive bus and the ground, between the direct current negative bus and the ground, between an output end of the first inverter and the ground, between an output end of the second inverter and the ground, or between an input end of the direct current power supply and the ground.

In an implementation, the direct current power supply includes a direct current/direct current conversion circuit and a negative voltage generation circuit; an input end of the direct current/direct current conversion circuit is configured to connect to a direct current, a first output end of the direct current/direct current conversion circuit is connected to the first end of the direct current positive bus, and a second output end of the direct current/direct current conversion circuit is connected to the first end of the neutral bus; a first input end of the negative voltage generation circuit is connected to the first output end of the direct current/direct current conversion circuit, a second input end of the negative voltage generation circuit is connected to the second output end of the direct current/direct current conversion circuit, a first output end of the negative voltage generation circuit is connected to the first end of the neutral bus, and a second output end of the negative voltage generation circuit is connected to the first end of the direct current negative bus; and the negative voltage generation circuit is configured to convert an output voltage of the direct current/direct current conversion circuit into a negative voltage for output.

In an implementation, the controller is configured to control, in the startup process in any one of the following startup modes, the voltage to ground of the direct current positive bus, the voltage to ground of the direct current negative bus, and the voltage to ground of the neutral bus each to be less than or equal to the preset voltage threshold: in the startup process, controlling the direct current/direct current conversion circuit and the first inverter to first turn on, then controlling the voltage regulation circuit to turn on, and finally controlling the negative voltage generation circuit to turn on and the second inverter to turn on; or in the startup process, controlling the direct current/direct current conversion circuit to turn on, then controlling the voltage regulation circuit to turn on, then controlling the negative voltage generation circuit to turn on, and finally controlling the first inverter and the second inverter to turn on; or in the startup process, controlling the first inverter to turn on, then controlling the voltage regulation circuit to turn on, then controlling the second inverter to turn on, and finally controlling the negative voltage generation circuit and the direct current/direct current conversion circuit to turn on. Further, it should be appreciated that, in the embodiments, the term "finally" may be used as in indicator in an order of operations, but should not be understood to mean that there are no other intervening steps before or after.

In an implementation, the controller is configured to control, in the startup process in any one of the following shutdown modes, the voltage to ground of the direct current positive bus, the voltage to ground of the direct current negative bus, and the voltage to ground of the neutral bus each to be less than or equal to the preset voltage threshold: in the shutdown process, controlling the second inverter and the negative voltage generation circuit to turn off, then controlling the first inverter and the direct current/direct current conversion circuit to turn off, and finally controlling the voltage regulation circuit to turn off; or in the shutdown process, controlling the first inverter and the second inverter to turn off, then controlling the negative voltage generation circuit and the direct current/direct current conversion circuit to turn off, and finally controlling the voltage regulation circuit to turn off.

In an implementation, a power converter includes a direct current/direct current conversion circuit and a positive voltage generation circuit; an input end of the direct current/ direct current conversion circuit is configured to connect to a direct current, a first output end of the direct current/direct current conversion circuit is connected to the first end of the neutral bus, and a second output end of the direct current/direct current conversion circuit is connected to the first end of the direct current negative bus; a first input end of the positive voltage generation circuit is connected to the first output end of the direct current/direct current conversion circuit, a second input end of the positive voltage generation circuit is connected to the second output end of the direct current/direct current conversion circuit, a first output end of the positive voltage generation circuit is connected to the first end of the direct current positive bus, and a second output end of the positive voltage generation circuit is connected to the first end of the neutral bus; and the positive voltage generation circuit is configured to convert an output voltage of the direct current/direct current conversion circuit into a positive voltage for output.

In an implementation, the controller is configured to control, in the startup process in any one of the following startup modes, the voltage to ground of the direct current positive bus, the voltage to ground of the direct current negative bus, and the voltage to ground of the neutral bus each to be less than or equal to the preset voltage threshold: in the startup process, controlling the direct current/direct current conversion circuit and the second inverter to turn on, then controlling the voltage regulation circuit to turn on, then controlling the positive voltage generation circuit to turn on, and finally controlling the first inverter to turn on; or in the startup process, controlling the direct current/direct current conversion circuit to turn on, then controlling the voltage regulation circuit to turn on, then controlling the positive voltage generation circuit to turn on, and finally controlling the first inverter and the second inverter to turn on; or in the startup process, controlling the first inverter to turn on, then controlling the voltage regulation circuit to turn on, then controlling the second inverter to turn on, and finally controlling the positive voltage generation circuit and the direct current/direct current conversion circuit to turn on.

In an implementation, the controller is configured to control, in the shutdown process in any one of the following shutdown modes, the voltage to ground of the direct current positive bus, the voltage to ground of the direct current negative bus, and the voltage to ground of the neutral bus each to be less than or equal to the preset voltage threshold: controlling the first inverter and the positive voltage generation circuit to turn off, then controlling the second inverter and the direct current/direct current conversion circuit to turn off, and finally controlling the voltage regulation circuit to turn off; or controlling the first inverter and the second inverter to turn off, then controlling the positive voltage generation circuit and the direct current/direct current conversion circuit to turn off, and finally controlling the voltage regulation circuit to turn off.

An embodiment further provides a control method for a photovoltaic system. The photovoltaic system includes a first inverter and a second inverter; a first end of a direct current positive bus, a first end of a neutral bus, and a first end of a direct current negative bus are all connected to a photovoltaic array; a first input end of the first inverter is connected to a second end of the direct current positive bus, and a second input end of the first inverter is connected to a second end of the neutral bus; a first input end of the second inverter is connected to the second end of the neutral bus, and a second input end of the second inverter is connected to a second end of the direct current negative bus; and the method includes: in startup and shutdown processes of the photovoltaic system, controlling a voltage to ground of the direct current positive bus, a voltage to ground of the direct current negative bus, and a voltage to ground of the neutral bus each to be less than or equal to a preset voltage threshold.

The advantages of the photovoltaic system provided in the foregoing embodiments are also applicable to the method. Details are not described herein again.

In an implementation, the photovoltaic system further includes a power converter; an input end of the power converter is configured to connect to the photovoltaic array, a first output end of the power converter is connected to the first end of the direct current positive bus, a second output end of the power converter is connected to the first end of the neutral bus, and a third output end of the power converter is connected to the first end of the direct current negative bus; the photovoltaic system further includes a voltage regulation circuit connected between ground and any one of the direct current positive bus, the direct current negative bus, the neutral bus, the input end of the power converter, an output end of the first inverter, or an output end of the second inverter; and the power converter includes a direct current/direct current conversion circuit and a negative voltage generation circuit; and in the startup process, the controlling a voltage to ground of the direct current positive bus, a voltage to ground of the direct current negative bus, and a voltage to ground of the neutral bus each to be less than or equal to a preset voltage threshold includes: controlling the direct current/direct current conversion circuit and the first inverter to first turn on, then controlling the voltage regulation circuit to turn on, and finally controlling the negative voltage generation circuit to turn on and the second inverter to turn on; or controlling the direct current/direct current conversion circuit to turn on, then controlling the voltage regulation circuit to turn on, then controlling the negative voltage generation circuit to turn on, and finally controlling the first inverter and the second inverter to turn on; or controlling the first inverter to turn on, then controlling the voltage regulation circuit to turn on, then controlling the second inverter to turn on, and finally controlling the negative voltage generation circuit and the direct current/direct current conversion circuit to turn on.

In an implementation, in the shutdown process, the controlling a voltage to ground of the direct current positive bus, a voltage to ground of the direct current negative bus, and a voltage to ground of the neutral bus each to be less than or equal to a preset voltage threshold includes: controlling the second inverter and the negative voltage generation circuit to turn off, then controlling the first inverter and the direct current/direct current conversion circuit to turn off, and finally controlling the voltage regulation circuit to turn off; or controlling the first inverter and the second inverter to turn off, then controlling the negative voltage generation circuit and the direct current/direct current conversion circuit to turn off, and finally controlling the voltage regulation circuit to turn off.

In an implementation, the photovoltaic system further includes a voltage regulation circuit connected between ground and any one of the direct current positive bus, the direct current negative bus, the neutral bus, the input end of the power converter, an output end of the first inverter, or an output end of the second inverter; and the power converter includes a direct current/direct current conversion circuit and a positive voltage generation circuit; and in the startup process, the controlling a voltage to ground of the direct current positive bus, a voltage to ground of the direct current negative bus, and a voltage to ground of the neutral bus each to be less than or equal to a preset voltage threshold includes: controlling the direct current/direct current conversion circuit and the second inverter to turn on, then controlling the voltage regulation circuit to turn on, then controlling the positive voltage generation circuit to turn on, and finally controlling the first inverter to turn on; or controlling the direct current/direct current conversion circuit to turn on, then controlling the voltage regulation circuit to turn on, then controlling the positive voltage generation circuit to turn on, and finally controlling the first inverter and the second inverter to turn on; or controlling the first inverter to turn on, then controlling the voltage regulation circuit to turn on, then controlling the second inverter to turn on, and finally controlling the positive voltage generation circuit and the direct current/direct current conversion circuit to turn on.

In an implementation, in the shutdown process, the controlling a voltage to ground of the direct current positive bus, a voltage to ground of the direct current negative bus, and a voltage to ground of the neutral bus each to be less than or equal to a preset voltage threshold includes: controlling the first inverter and the positive voltage generation circuit to turn off, then controlling the second inverter and the direct current/direct current conversion circuit to turn off, and finally controlling the voltage regulation circuit to turn off; or controlling the first inverter and the second inverter to turn off, then controlling the positive voltage generation circuit and the direct current/direct current conversion circuit to turn off, and finally controlling the voltage regulation circuit to turn off.

It may be understood from the foregoing solutions that embodiments have at least the following advantages:

The photovoltaic system includes the three direct current buses, which are the direct current positive bus BUS+, the direct current negative bus BUS−, and the neutral bus M. A maximum voltage of the direct current bus is a voltage between the direct current positive bus and the direct current negative bus. However, because there is the neutral bus M, for the photovoltaic system, the production compliance only needs to be set according to half of the maximum voltage of the direct current bus. Therefore, the requirement of the production compliance voltage is reduced. In addition, because the maximum voltage of the direct current bus is the voltage between BUS+ and BUS−, a relatively large direct current bus voltage can be obtained under a same production compliance voltage. When a voltage of the direct current bus is larger, in a case of same power, a current of the direct current bus can be reduced. Therefore, losses of the photovoltaic system can be reduced, and power supplying efficiency of the photovoltaic system can be improved. The voltage level of the foregoing photovoltaic system is large, and the production compliance voltage is low. For example, the voltage level is 3000 V, and the production compliance voltage is half of the bus voltage, for example, 1500 V. Consequently, for this photovoltaic system, a case of exceeding the production compliance voltage is more likely to occur. Therefore, it needs to strictly control a sequence of each device in the photovoltaic system during startup and a sequence of each device during shutdown, to ensure that no overvoltage occurs, and meet the production compliance requirement.

The solutions provided in the embodiments are intended for this photovoltaic system. To meet the production compliance requirement, the voltage to ground of the direct current positive bus BUS+, the voltage to ground of the direct current negative bus BUS−, and the voltage to ground of the neutral bus M cannot be greater than the preset voltage threshold. That is, it may be ensured that in the startup and shutdown processes and an operating process of the photovoltaic system, the voltages to ground of the three direct current buses BUS+, BUS−, and M cannot exceed the production compliance requirement, to ensure personal safety and device safety. In the operating process of the photovoltaic system, if a voltage exceeds the preset voltage threshold, that is, an overvoltage occurs, measures need to be taken in a timely manner to avoid expansion of a fault range, and the photovoltaic system may be controlled to shut down when necessary. Startup and shutdown in embodiments mean startup and shutdown of the photovoltaic system. The startup and the shutdown may be actively performed by the photovoltaic system itself. For example, when there is no sunlight or sunlight is poor, the photovoltaic array has no power output, and in this case, the photovoltaic system may shut down by itself. In addition, the photovoltaic system may also receive an instruction from a host to shut down. This is not limited in the embodiments.

DETAILED DESCRIPTION OF EMBODIMENTS

The terms such as "first" and "second" in the description below are used only for the purpose of description and cannot be understood as indicating or implying relative immediacy or implicitly indicating a quantity of features indicated. Therefore, the features defined with "first", "second", and the like can explicitly or implicitly include one or more of the features. In the descriptions of the embodiments, unless otherwise specified, "a plurality of" means two or more.

In addition orientation terms such as "up" and "down" may include, but are not limited to, orientations schematically placed relative to components in the accompanying drawings. It should be understood that these directional terms may be relative concepts, and are used for relative description and clarification, and may be correspondingly changed based on changes in placement orientations of the components in the accompanying drawings.

In the embodiments, unless otherwise expressly specified and limited, the term "connection" should be understood in a broad sense. For example, "connection" may be a fixed connection, a detachable connection, or an integrated connection, or may be a direct connection or an indirect connection through an intermediate medium. In addition, the term "coupling" may be a manner of implementing electrical connection of signal transmission. "Coupling" may be a direct electrical connection, or may be an indirect electrical connection through an intermediate medium.

Photovoltaic System Embodiment

To enable persons skilled in the art to better understand the solutions provided in the embodiments, the following describes a photovoltaic system provided in an embodiment.

Figure 1A:
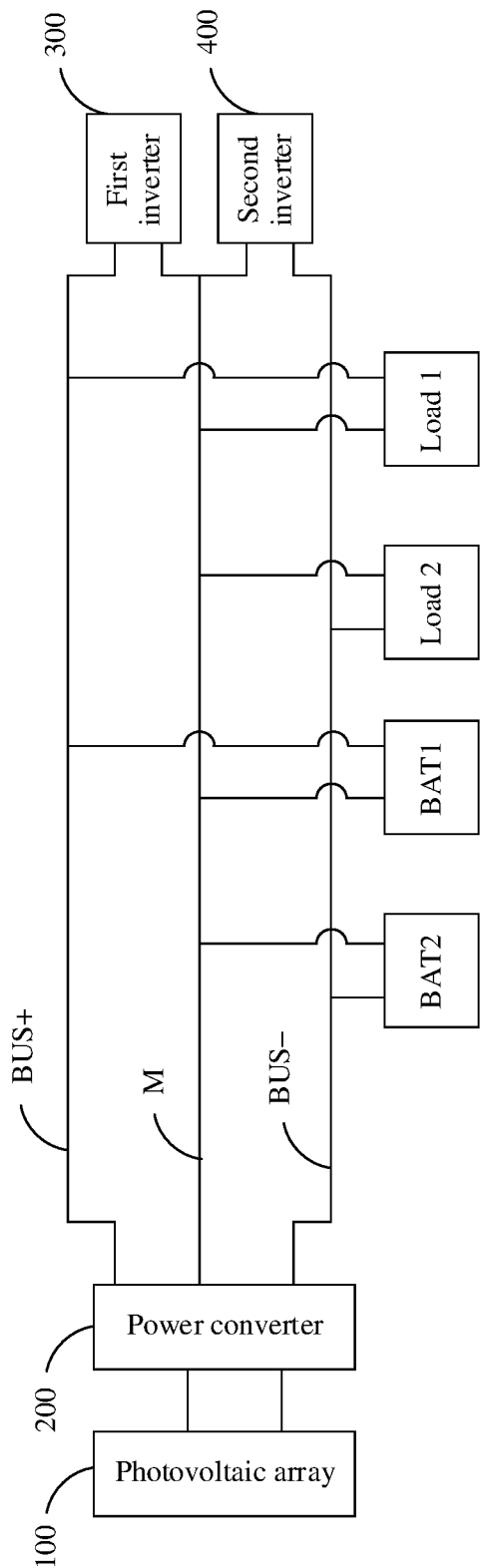
FIG. 1A is a schematic diagram of a photovoltaic system according to an embodiment.

FIG. 1A is a schematic diagram of a photovoltaic system according to an embodiment.

This embodiment provides the photovoltaic system. A difference between the photovoltaic system and a conventional unipolar photovoltaic system is that the photovoltaic system includes three buses: a direct current positive bus BUS+, a neutral bus M, and a direct current negative bus BUS−. The conventional unipolar photovoltaic system includes only two direct current buses: BUS+ and BUS−.

As shown in FIG. 1A, to distinguish from the unipolar photovoltaic system, in this embodiment, a bipolar photovoltaic system is used as an example for description. The bipolar photovoltaic system includes both a positive potential and a negative potential.

An input end of a power converter 200 is configured to connect to a photovoltaic array 100, a first output end of the power converter 200 is connected to a first end of the direct current positive bus BUS+, a second output end of the power converter 200 is connected to a first end of the neutral bus M, and a third output end of the power converter 200 is connected to a first end of the direct current negative bus BUS−. An implementation form of the photovoltaic array 100 is not limited in this embodiment. For example, a plurality of photovoltaic groups connected in series and in parallel may be included. A specific connection manner between the power converter 200 and the photovoltaic array is also not limited in this embodiment. The input end of the power converter 200 may be connected to the photovoltaic array 100. The power converter 200 may include two direct current/direct current conversion circuits inside, one direct current/direct current conversion circuit corresponds to BUS+ and M, and the other direct current/direct current conversion circuit corresponds to M and BUS−. In addition, the power converter 200 may alternatively be located in a combiner box. The bipolar photovoltaic system is not limited.

Figure 1B:
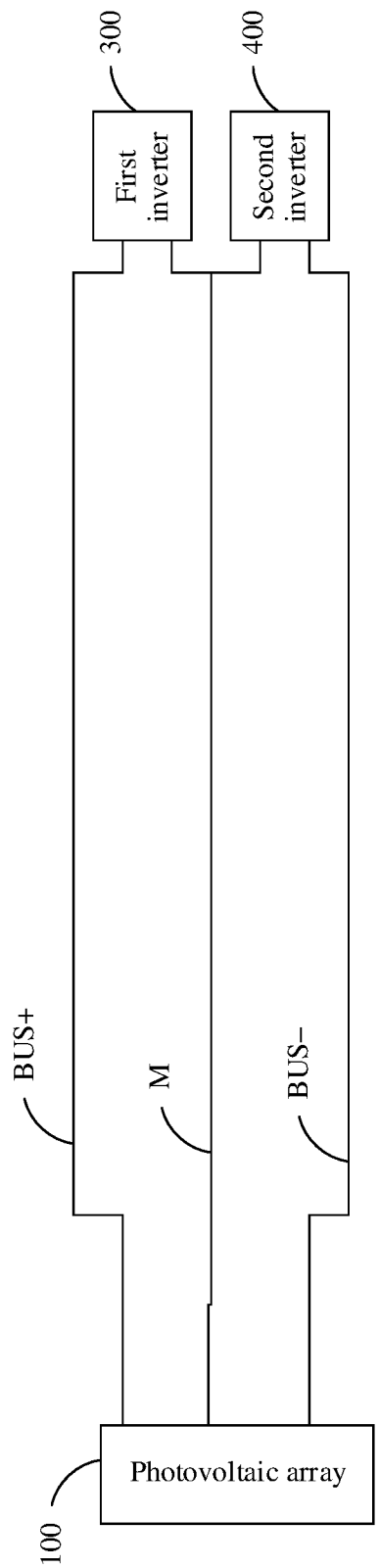
FIG. 1B is a schematic diagram of another photovoltaic system corresponding to FIG. 1A.

It should be noted that the photovoltaic system provided in this embodiment may not include the power converter 200, that is, the three direct current buses BUS+, M, and BUS− may be directly connected to the photovoltaic array. In this embodiment, for ease of understanding, an example in which the photovoltaic system includes a power converter is used. As shown in FIG. 1B, three direct current buses BUS+, M, and BUS− may be directly connected to the photovoltaic array 100, and the photovoltaic array 100 outputs voltages of three different potentials.

Figure 1C:
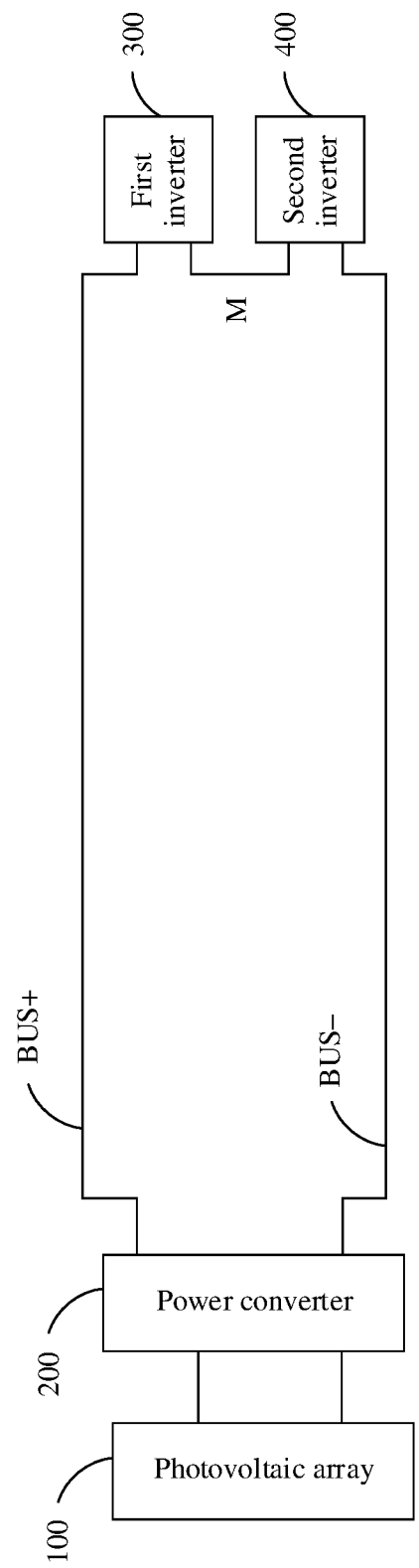
FIG. 1C is a schematic diagram of still another photovoltaic system according to an embodiment.

Both FIG. 1A and FIG. 1B are described by using the three direct current buses as an example. It should be understood that, in the photovoltaic system and a power supply system provided in the embodiments, the neutral bus in the three direct current buses may not exist as an open wire. For example, a neutral bus on an inverter side and a neutral bus on a power converter side may not be connected together, provided that it is ensured that potentials of the neutral buses on the two sides are within a threshold range. For example, a potential to ground of a neutral point of the inverter is less than 100 V, and a potential to ground of a neutral point of the power converter is less than 100 V. As shown in FIG. 1C, a second input end of a first inverter 300 is connected to the neutral bus M, and a first input end of a second inverter is connected to the neutral bus M, provided that it is ensured that the second input end of the first inverter 300 and the first input end of the second inverter have a same potential and a same potential as the neutral bus. M on the inverter side may not be connected to the output end of the power converter. In the following embodiments, for ease of understanding, that the neutral bus M is an open wire is used as an example for description.

In addition, the photovoltaic system includes at least two inverters: the first inverter 300 and a second inverter 400.

A first input end of the first inverter 300 is connected to a second end of the direct current positive bus BUS+, and the second input end of the first inverter 300 is connected to a second end of the neutral bus M.

A first input end of the second inverter 400 is connected to the second end of the neutral bus M, and a second input end of the second inverter 400 is connected to a second end of the direct current negative bus BUS−.

For example, if a voltage of BUS+ is +1500 V and a voltage of BUS− is −1500 V, a voltage level of the bipolar photovoltaic system is plus-minus 1500 V. However, a total voltage of a direct current bus obtained after BUS+ and BUS− are connected in series is 3000 V. Therefore, it is only required that the bipolar photovoltaic system provided in this embodiment is applicable to a production compliance of 1500 V, which reduces withstand voltage requirements of power transistors in the power converter and the inverter. For example, a voltage level of the input end of each of the first inverter 300 and the second inverter 400 is 1500 V, an input voltage of the first inverter 300 is between a voltage of the neutral bus and the voltage of BUS+, and an input voltage of the second inverter 400 is between the voltage of the BUS− and the voltage of the neutral bus. Generally, the neutral bus M is basically at an equal potential as ground. For example, when M is equal to a ground potential, the input voltage of the first inverter 300 is 0 V-1500 V, and the input voltage of the second inverter 400 is −1500 V-0 V.

Therefore, withstand voltage levels of power transistors inside the power converters are reduced relative to a conventional input voltage of 3000 V. The photovoltaic system provided in this embodiment can effectively reduce a voltage level to be withstood by a power component without reducing a total bus voltage, thereby facilitating type selection of the power component.

A load or an energy storage battery may be mounted between BUS+ and M, or between BUS− and M. As shown in FIG. 1, an energy storage battery BAT1 is mounted between BUS+ and M, an energy storage battery BAT2 is mounted between BUS− and M, a load 1 is mounted between BUS+ and M, and a load 2 is mounted between BUS− and M.

M may be grounded in a direct or indirect manner. When M is grounded in the indirect manner, for example, M may be grounded by using at least one of a fuse, a relay, a contactor, a resistor, a voltage regulator tube, or the like, for example, grounded by using the voltage regulator tube, or ground by using the relay and the voltage regulator tube connected in series.

In addition, M may be further grounded by using a voltage regulation circuit, and the voltage regulation circuit may regulate a voltage between M and the ground.

Regardless of connecting M to the ground in which of the foregoing manners, it should be ensured that a voltage difference between M and the ground is within a preset voltage threshold range. A preset voltage threshold may be selected based on a voltage between BUS+ and BUS− and a voltage to ground of M. Finally, a voltage to ground of BUS+, a voltage to ground of BUS−, and the voltage to ground of M each should be less than or equal to the preset voltage threshold, to ensure safe operating of the system.

Figure 2:
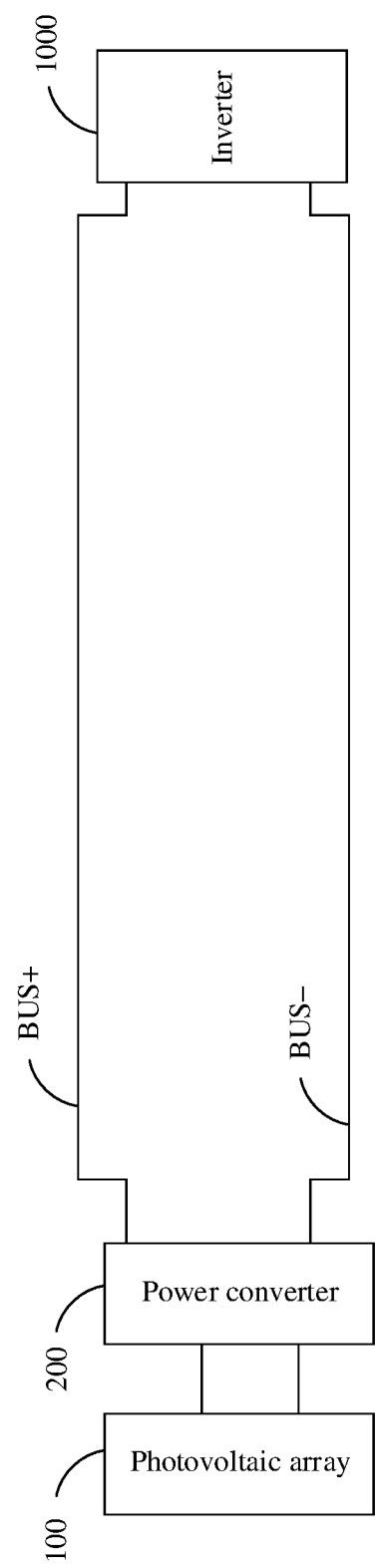
FIG. 2 is a schematic diagram of a conventional unipolar photovoltaic system.

To enable persons skilled in the art to better understand advantages of the bipolar photovoltaic system provided in this embodiment, reference is made to FIG. 2. FIG. 2 is a schematic diagram of a conventional unipolar photovoltaic system.

A power converter 200 includes two output ends, a first output end of the power converter 200 is connected to a direct current positive bus BUS+, and a second output end of the power converter 200 is connected to a direct current negative bus BUS−. Similarly, an inverter 1000 includes two input ends, a first input end of the inverter 1000 is connected to BUS+, and a second input end of the inverter 1000 is connected to BUS−. An input end of the power converter 200 is connected to a photovoltaic array 100.

By comparing with FIG. 1 and FIG. 2, it can be found that the unipolar photovoltaic system shown in FIG. 2 includes two direct current buses, which are BUS+ and BUS−. If a total voltage of the direct current buses continues to be 3000 V, a voltage level connected to the input end of the inverter 1000 is 3000 V. In this case, a withstand voltage of a power transistor inside the inverter 1000 is twice higher than a withstand voltage of a power transistor in a single inverter shown in FIG. 1. Therefore, the bipolar photovoltaic system shown in FIG. 1 can reduce a voltage to be withstood by a power component, and facilitate component selection.

During actual operating, a distance between the power converter and a post-stage inverter may be long, and consequently losses on power cables corresponding to the direct current buses are large. Therefore, to improve power generation efficiency, the losses need to be reduced as much as possible. The total voltage corresponding to the direct current buses in FIG. 1 is 3000 V. In a case of equal power, a higher voltage indicates a smaller corresponding current. Therefore, losses on the direct current buses can be reduced.

The voltage level of the foregoing photovoltaic system is large, and a production compliance voltage is low. For example, the voltage level is 3000 V, and the production compliance voltage is half of the bus voltage, for example, 1500 V. Consequently, for this photovoltaic system, a case of exceeding the production compliance voltage is more likely to occur. Therefore, it needs to strictly control a sequence of each device in the photovoltaic system during startup and a sequence of each device during shutdown, to ensure that no overvoltage occurs, and meet a production compliance requirement.

To meet the production compliance requirement, the voltage to ground of BUS+, the voltage to ground of BUS−, and the voltage to ground of M cannot be greater than the preset voltage threshold. For example, it needs to be ensured that in startup, shutdown, and operating processes of the photovoltaic system, the voltages to ground of the three direct current buses BUS+, BUS−, and M cannot exceed the production compliance requirement, to ensure personal safety and device safety. In the operating process of the photovoltaic system, if a voltage in some place exceeds the preset voltage threshold, that is, an overvoltage occurs, the photovoltaic system needs to be shut down in a timely manner for protection, to avoid expansion of a fault range. The startup and the shutdown in this embodiment respectively mean the startup and the shutdown of the photovoltaic system, that is, the photovoltaic system runs during startup, and the photovoltaic system stops running during shutdown. The startup and the shutdown may be actively performed by the photovoltaic system itself. For example, when there is no sunlight or sunlight is poor, the photovoltaic array has no power output, and in this case, the photovoltaic system may shut down by itself. In addition, the photovoltaic system may also receive an instruction from a host to shut down. This is not limited in the embodiments.

Figure 3:
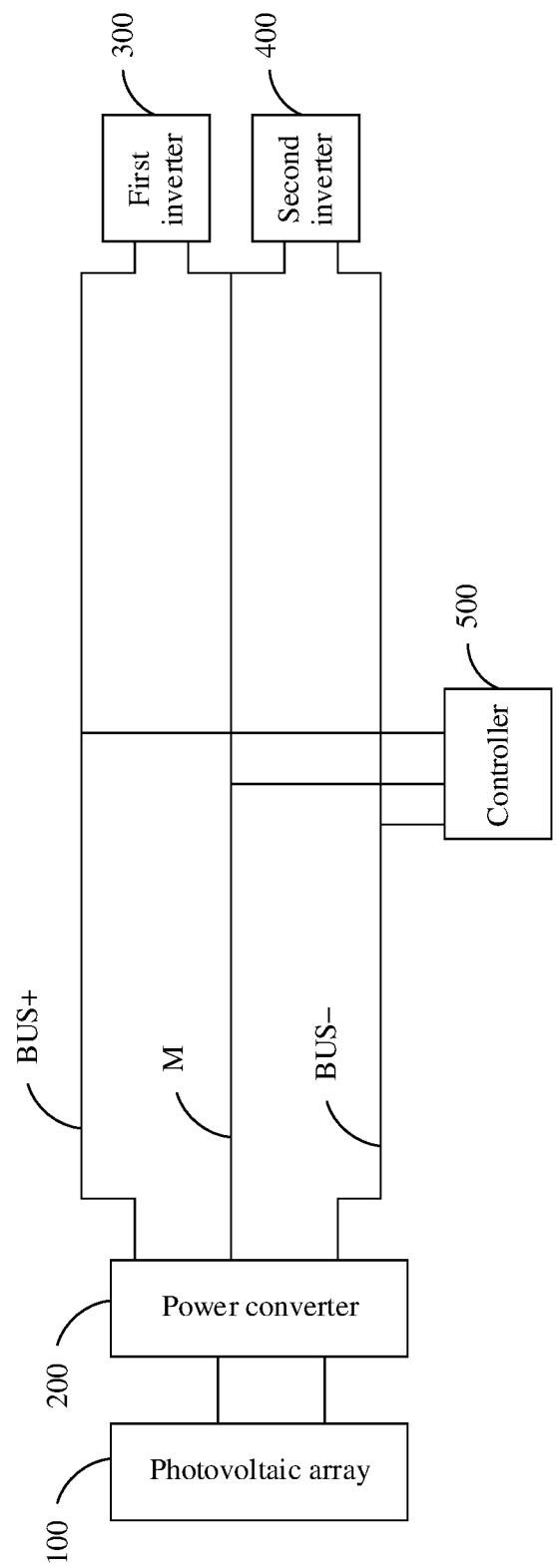
FIG. 3 is a schematic diagram of still another photovoltaic system according to an embodiment.

Therefore, in addition to the first inverter 300 and the second inverter 400, the photovoltaic system provided in this embodiment further includes a controller 500. FIG. 3 is a schematic diagram of still another photovoltaic system according to an embodiment.

In this embodiment, bipolar photovoltaic system continues to be used as an example for description.

The controller 500 is configured to control, in the startup process of the photovoltaic system, the voltage to ground of the direct current positive bus, the voltage to ground of the direct current negative bus, and the voltage to ground of the neutral bus each to be less than or equal to the preset voltage threshold. In addition, in the shutdown process of the photovoltaic system, the controller 500 also needs to control the voltage to ground of the direct current positive bus, the voltage to ground of the direct current negative bus, and the voltage to ground of the neutral bus each to be less than or equal to the preset voltage threshold. In other words, the controller 500 needs to strictly control the turn-on sequence and the shutdown sequence of each device in the photovoltaic system, for example, two inverters and a corresponding photovoltaic array. When a power converter is included, an operating sequence of the power converter further needs to be controlled, to avoid breakdown and damage to a power component inside the device due to an overvoltage born by each device in the photovoltaic system. For the bipolar photovoltaic system in this embodiment, the power component in each device is designed based on the production compliance voltage, for example, designed based on a production compliance voltage corresponding to 1500 V. However, a maximum bus voltage of the bipolar photovoltaic system may reach 3000 V. If an operation is improper, a high voltage of 3000 V may be applied to an inverter or a power converter with 1500 V bearing capacity, causing damage to the device. For example, a positive half bus voltage is first established, that is, the first inverter 300 is first turned on and a corresponding voltage is the positive half bus voltage. The second inverter 400 is then turned on and a corresponding voltage is a negative half bus voltage. Alternatively, the negative half bus voltage may be first established, and the positive half bus voltage is then established, that is, the second inverter 400 is first turned on, and the first inverter 300 is then turned on. It should be understood that this embodiment may also include two independent photovoltaic arrays. An input end of the first inverter 300 is connected to one photovoltaic array, and an input end of the second inverter 400 is connected to the other photovoltaic array.

It should be understood that, when M is directly grounded or indirectly grounded, M is basically at a same potential as the ground. For startup and shutdown of the bipolar photovoltaic system in various cases, it can ensure that the voltage to ground of BUS+ and the voltage to ground of BUS− do not exceed the preset voltage threshold, that is, do not exceed a maximum voltage set by the system, thereby ensuring system safety. However, when M is grounded by using the voltage regulation circuit, startup and shutdown time sequences need to be controlled, to ensure that the voltage to ground of BUS+, the voltage to ground of BUS−, and the voltage to ground of M do not exceed the preset voltage threshold.

The following describes in detail, with reference to the accompanying drawings, when M is grounded by using the voltage regulation circuit, in the startup and shutdown processes, the controller controls the startup time sequence and the shutdown time sequence to ensure that the voltage to ground of BUS+, the voltage to ground of BUS−, and the voltage to ground of M do not exceed the preset voltage threshold.

Figure 4:
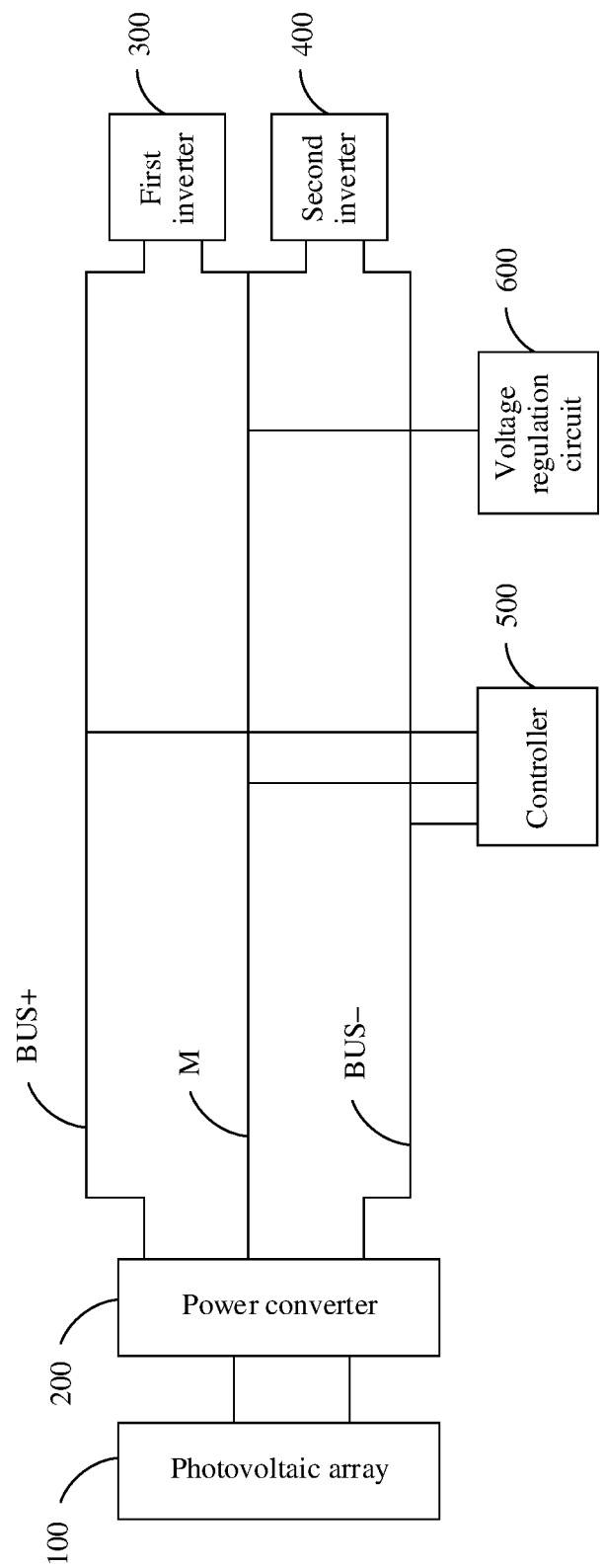
FIG. 4 is a schematic diagram of yet another photovoltaic system according to an embodiment.

FIG. 4 is a schematic diagram of yet another bipolar photovoltaic system according to an embodiment.

The bipolar photovoltaic system provided in this embodiment further includes a voltage regulation circuit 600. A specific location to which the voltage regulation circuit 600 is connected is not limited in this embodiment. For example, the voltage regulation circuit 600 may be connected to any one of the following locations: between the neutral bus and the ground, between the direct current positive bus and the ground, between the direct current negative bus and the ground, between an output end of the first inverter and the ground, between an output end of the second inverter and the ground, or between the input end of the power converter and the ground.

A specific implementation form of the voltage regulation circuit 600 is not limited in this embodiment, as long as the circuit is a circuit that can implement voltage regulation, which may be added, or may be implemented by using an existing component in the photovoltaic system. In actual application, a possible implementation is as follows: For example, the voltage regulation circuit 600 may include at least an anti-potential induced degradation (PID) apparatus. A photovoltaic system usually needs anti-potential induced degradation. Therefore, a corresponding PID apparatus needs to be disposed, and the PID apparatus may be connected between M and the ground, to regulate a voltage to ground of an M point while implementing anti-potential induced degradation.

The following uses an example in which the power converter includes a direct current/direct current conversion circuit and a negative voltage generation circuit for description.

Figure 5:
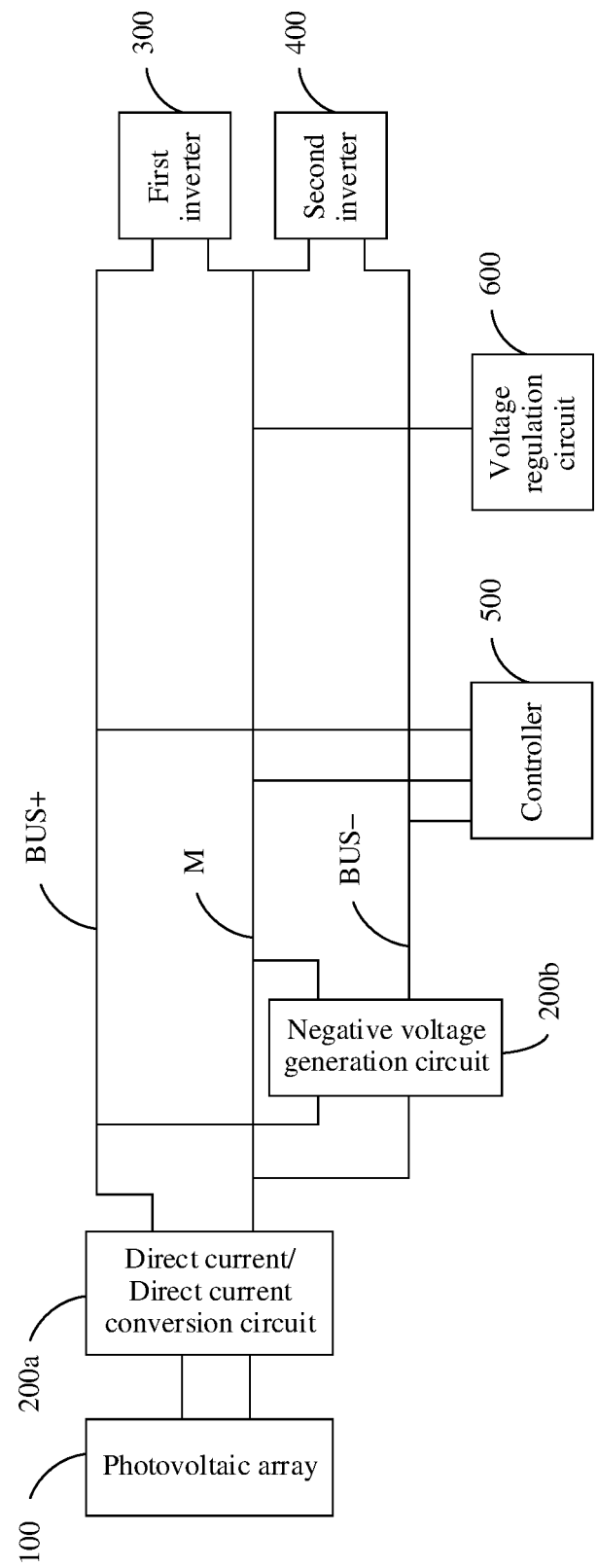
FIG. 5 is a schematic diagram of another photovoltaic system according to an embodiment.

FIG. 5 is a schematic diagram of another bipolar photovoltaic system according to an embodiment.

An input end of the direct current/direct current conversion circuit is configured to connect to the photovoltaic array 100, a first output end of a direct current/direct current conversion circuit 200a is connected to the first end of the direct current positive bus BUS+, and a second output end of the direct current/direct current conversion circuit 200a is connected to the first end of the neutral bus M.

A first input end of a negative voltage generation circuit 200b is connected to the first output end of the direct current/direct current conversion circuit 200a, a second input end of the negative voltage generation circuit 200b is connected to the second output end of the direct current/direct current conversion circuit 200a, a first output end of the negative voltage generation circuit 200b is connected to the first end of the neutral bus M, and a second output end of the negative voltage generation circuit 200b is connected to the first end of the direct current negative bus BUS−.

The negative voltage generation circuit 200b is configured to convert an output voltage of the direct current/direct current conversion circuit 200a into a negative voltage for output.

First, a startup control process with the negative voltage generation circuit 200b is described. The following uses three startup time sequences as an example for description.

A First Startup Control Mode.

The controller 500 is configured to: in the startup process, control the direct current/direct current conversion circuit 200a and the first inverter 300 to first turn on, that is, first turn on the direct current positive bus BUS+, and maintain a voltage of the direct current positive bus BUS+, that is, run a positive half bus; then control the voltage regulation circuit 600 to turn on, to enable a voltage between M and the ground to be within a specific range, that is, the voltage to ground of M to be less than or equal to the preset voltage threshold; and finally control the negative voltage generation circuit 200b to turn on and the second inverter 400 to turn on, that is, finally generate a voltage of the direct current negative bus BUS−.

A Second Startup Control Mode.

The controller 500 is configured to: in the startup process, control the direct current/direct current conversion circuit 200a to turn on, that is, first turn on a left side, and then control the voltage regulation circuit 600 to turn on, that is, control a potential difference between M and the ground to be within a specific range, that is, the voltage to ground of M to be less than or equal to the preset voltage threshold; and then control the negative voltage generation circuit 200b to turn on to generate a voltage of the direct current negative bus, and finally control the first inverter 300 and the second inverter 400 to turn on.

A Third Startup Control Mode.

The controller 500 is configured to: in the startup process, control the first inverter 300 to first turn on, that is, first turn on a right side corresponding to a half bus, and then control the voltage regulation circuit 600 to turn on, that is, control a potential difference between M and the ground to be within a specific range, that is, the voltage to ground of M to be less than or equal to the preset voltage threshold; and then control the second inverter 400 to turn on, and finally controls the negative voltage generation circuit 200b and the direct current/direct current conversion circuit 200a to turn on, that is, finally generate a voltage of the direct current negative bus BUS−.

The foregoing is merely an example to describe three different startup sequences, and another startup sequence may also be used. However, in the startup process, it needs to be ensured that the voltages to ground of the three direct current buses BUS+, M, and BUS− each are less than or equal to the preset voltage threshold, and no overvoltage occurs. For example, in another startup time sequence, the voltage regulation circuit is first turned on, and after the voltage regulation circuit is turned on, a potential to ground of M is clamped. In this case, all other devices may be then turned on, for example, the first inverter 300 and the second inverter 400 are turned on, and the negative voltage generation circuit 200b and the direct current/direct current conversion circuit 200a are turned on.

The following describes a shutdown control process with the negative voltage generation circuit 200b. The following uses two shutdown time sequences as an example for description.

A First Shutdown Control Mode

The controller 500 is configured to: in the shutdown process, control the second inverter 400 and the negative voltage generation circuit 200b to turn off. Because the negative voltage generation circuit 200b is configured to generate the voltage of the direct current negative bus, after the negative voltage generation circuit 200b is turned off, the voltage of the direct current negative bus drops. After the voltage of the direct current negative bus drops to a safety threshold, the controller 500 then controls the first inverter 300 and the direct current/direct current conversion circuit 200a to turn off, and finally controls the voltage regulation circuit 600 to turn off. It should be noted that, that the voltage of the direct current negative bus drops to the safety threshold herein means that the voltage does not need to drop to a same potential as the ground, and the safety threshold herein is less than the preset voltage threshold described above. For example, for the half bus voltage of 1500 V, the preset voltage threshold may be set to 1200 V. That the direct current negative bus drops to the safety threshold herein may be dropping to about 300 V. Then, the first inverter 300 and the direct current/direct current conversion circuit 200a are controlled to turn off.

A Second Shutdown Control Mode.

The controller 500 is configured to: in the shutdown process, control the first inverter 300 and the second inverter 400 to turn off, then control the negative voltage generation circuit 200b and the direct current/direct current conversion circuit to turn off, and wait for a voltage of the direct current negative bus to drop to a specific threshold, and finally control the voltage regulation circuit 600 to turn off.

The foregoing is merely an example to describe two different shutdown sequences, and another shutdown sequence may also be used. However, in the shutdown process, it needs to be ensured that the voltages to ground of the three direct current buses BUS+, M, and BUS− each are less than or equal to the preset voltage threshold, and no overvoltage occurs.

It should be noted that, in this embodiment, in addition to monitoring the voltage to prevent the overvoltage, a magnitude of a ground leakage current of each direct current bus may be further monitored. When the leakage current exceeds a preset limit, the devices also need to be turned off. In addition, the direct current bus may be discharged by using a discharging circuit, to ensure that the voltages to ground of the three direct current buses drop to below the preset voltage threshold within a time required by a production compliance.

The following describes an implementation in which the bipolar photovoltaic system provided in this embodiment includes the negative voltage generation circuit and a discharging circuit.

Figure 6:
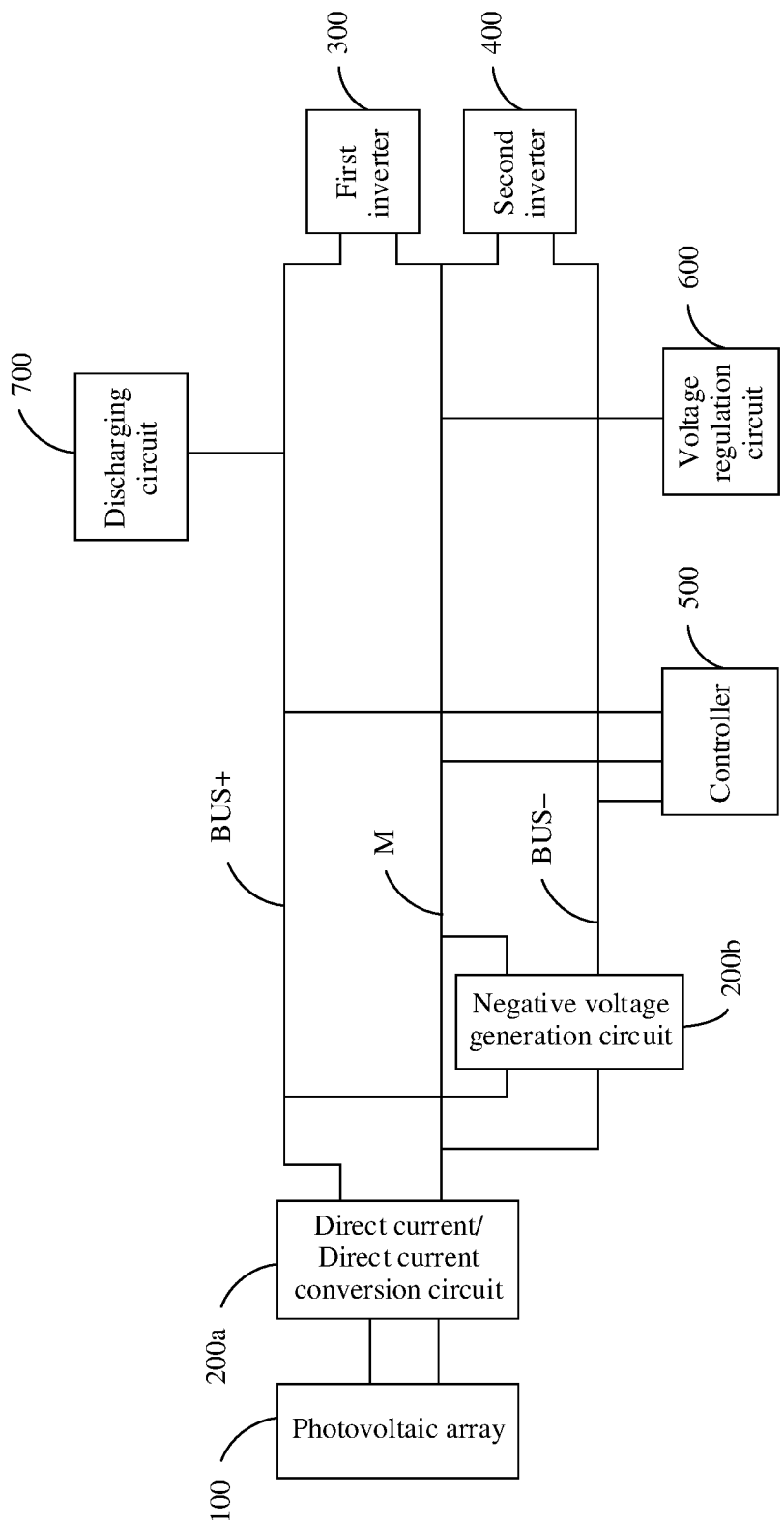
FIG. 6 is a schematic diagram of still another photovoltaic system according to an embodiment.

FIG. 6 is a schematic diagram of still another bipolar photovoltaic system according to an embodiment.

The photovoltaic system provided in this embodiment further includes a discharging circuit 700.

In an implementation, the discharging circuit 700 may be connected to the direct current positive bus BUS+ or the direct current negative bus BUS− by using a switch.

In FIG. 6, an example in which the discharging circuit 700 is connected to the direct current positive bus BUS+ is used for description. The controller 500 is further configured to: when the voltage to ground of the direct current positive bus, the voltage to ground of the direct current negative bus, or the voltage to ground of the neutral bus is greater than the preset voltage threshold, control the switch to turn on, and control the discharging circuit to discharge.

When the controller 500 controls the switch to turn on, BUS+ is grounded by using the discharging circuit 700, and BUS+ starts to discharge, thereby reducing the voltage of BUS+. When the controller 500 controls the switch to turn off, the discharging circuit 700 is disconnected from BUS+ to stop discharging. A specific implementation form of the switch is not limited in this embodiment, provided that the switch is a controllable switch device. In addition, the controllable switch device may also be integrated into the discharging circuit 700. In another possible implementation form, there may be no controllable switch, and the discharging circuit 700 may actively discharge BUS+ when the voltage of BUS+ exceeds the preset voltage threshold.

In addition, a specific implementation form of the power converter is not limited in this embodiment. For example, the power converter may include a buck conversion circuit, may include a boost conversion circuit, may include a buck-boost conversion circuit, and the like. The following uses that the power converter includes a boost conversion circuit as an example for description.

Figure 7A:
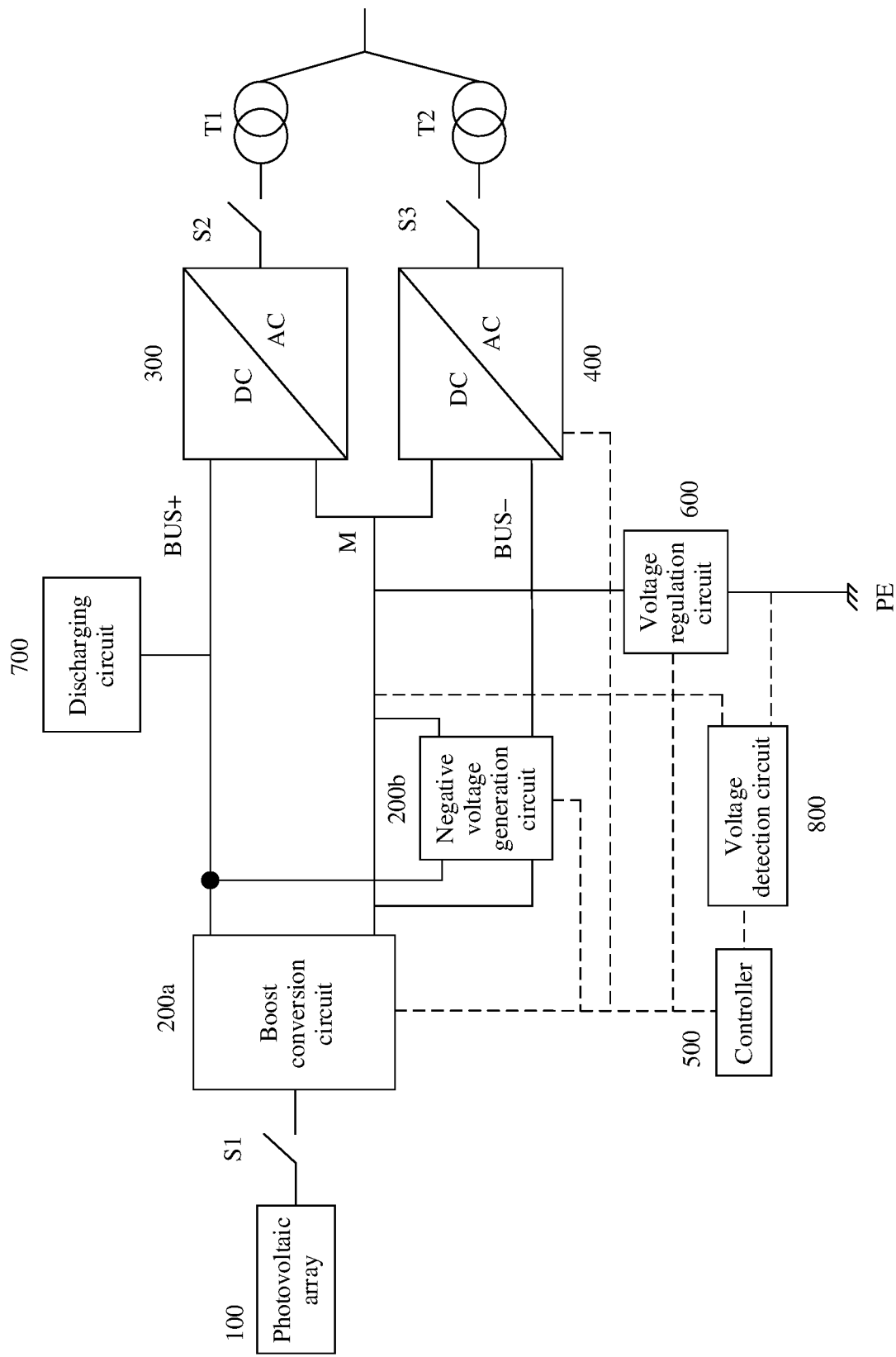
FIG. 7A is a schematic diagram of a photovoltaic system including a boost conversion circuit according to an embodiment.

FIG. 7A is a schematic diagram of a bipolar photovoltaic system including a boost conversion circuit according to an embodiment.

The direct current/direct current conversion circuit in the power converter is a boost conversion circuit 200a. The discharging circuit 700 is connected to the direct current positive bus BUS+. A first isolating switch S1 is further included.

The first isolating switch S1 is connected between the boost conversion circuit 200a and the photovoltaic array 100.

In another implementation, a second isolating switch S2 and a third isolating switch S3 may be further included. The second isolating switch S2 is connected between the output end of the first inverter 300 and a corresponding isolation transformer T1, and the third isolating switch S3 is connected between the output end of the second inverter 400 and a corresponding isolation transformer T2. For example, the first inverter 300 corresponds to the first isolation transformer T1, and the second inverter 400 corresponds to the second isolation transformer T2.

Figure 7B:
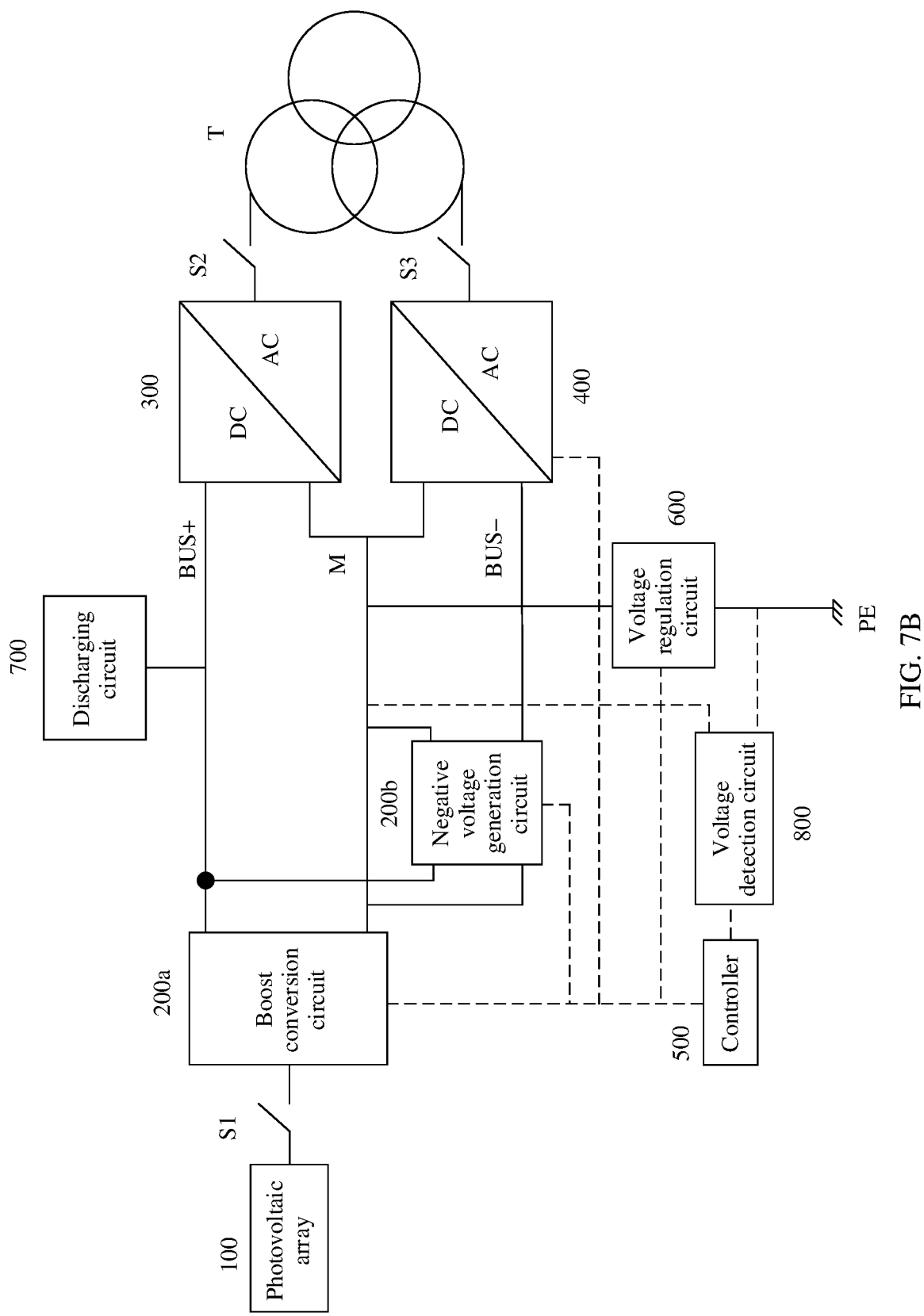
FIG. 7B is a schematic diagram of a bipolar photovoltaic system including a multi-winding isolation transformer according to an embodiment.

It should be noted that, in this embodiment, each figure is described by using two independent isolation transformers as an example. It should be understood that only one isolation transformer may be included. When one isolation transformer is included, the isolation transformer is a multi-winding isolation transformer. FIG. 7B is a schematic diagram of a bipolar photovoltaic system including a multi-winding isolation transformer according to an embodiment. The first inverter 300 and the second inverter 400 are separately connected to different primary windings of a multi-winding isolation transformer T.

The boost conversion circuit 200a boosts a voltage of the photovoltaic array 100 and outputs a boosted voltage. Therefore, the voltage of BUS+ is higher than the voltage of the photovoltaic array 100. If the voltage of BUS+ is an overvoltage, when the boost conversion circuit 200a is connected to the photovoltaic array 100, the voltage on BUS+ cannot be released. Therefore, the first isolating switch S1 needs to be controlled to turn off. Simultaneously, to avoid a next circuit, the isolating switches between the two inverters and the two transformers are also turned off.

The controller 500 is configured to: when the voltage to ground of the direct current positive bus BUS+, the voltage to ground of the direct current negative bus BUS−, or the voltage to ground of the neutral bus M is greater than the preset voltage threshold, control all of the first isolating switch S1, the second isolating switch S2, and the third isolating switch S3 to turn off, and control the discharging circuit 700 to discharge the direct current positive bus BUS+.

It should be understood that a voltage detection circuit 800 is usually needed to detect the voltage to ground of each direct current bus, and send a detected voltage to the controller 500. When the voltage to ground of the direct current bus is greater than the preset voltage threshold, the controller 500 controls the discharging circuit 700 to discharge the direct current bus.

The foregoing embodiments describe the startup, the shutdown, and discharge protection during the overvoltage when the bipolar photovoltaic system includes the negative voltage generation circuit. The following describes, with reference to the accompanying drawings, startup, shutdown, and discharge protection during an overvoltage when a bipolar photovoltaic system includes a positive voltage generation circuit.

Figure 8:
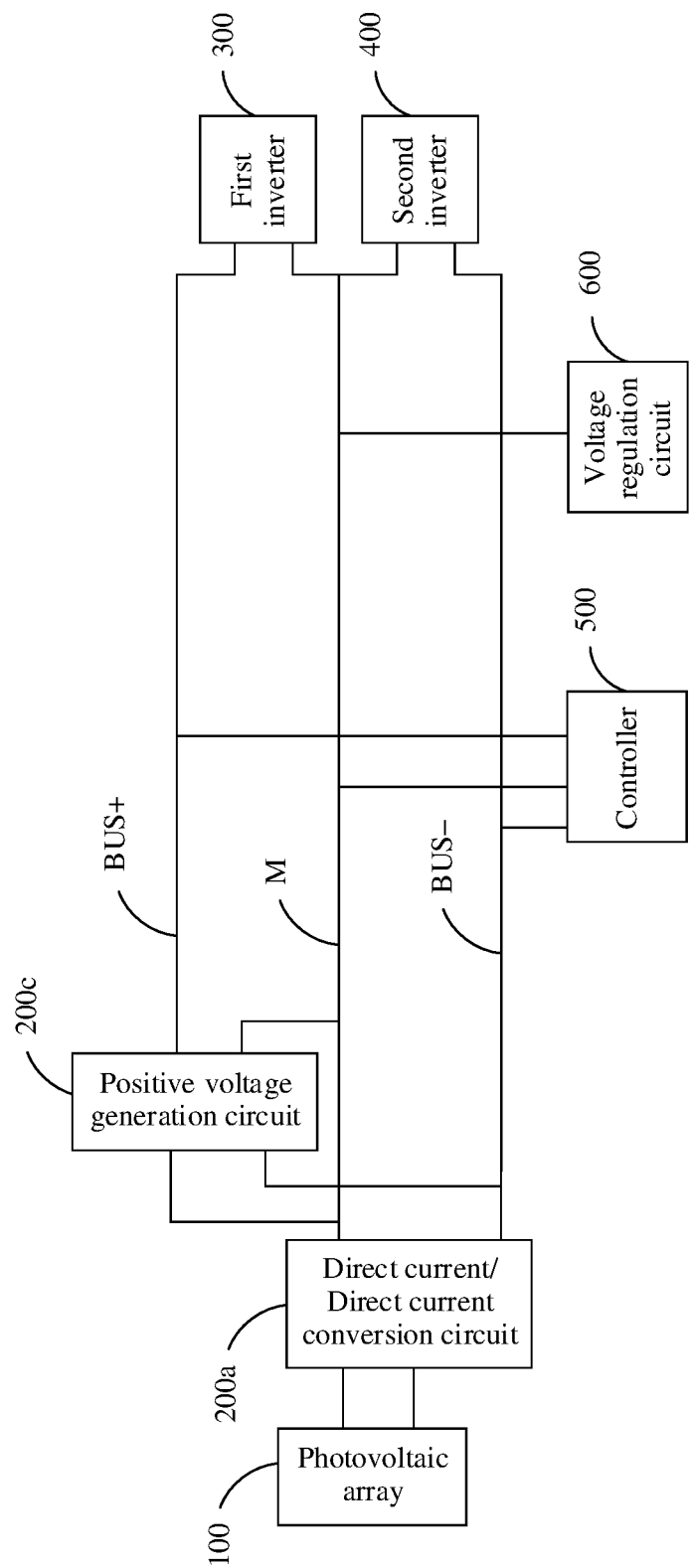
FIG. 8 is a schematic diagram of still another photovoltaic system according to an embodiment.

FIG. 8 is a schematic diagram of still another bipolar photovoltaic system according to an embodiment.

The power converter in the bipolar photovoltaic system provided in this embodiment includes a direct current/direct current conversion circuit 200a and a positive voltage generation circuit 200c.

As shown in FIG. 8, an input end of the direct current/direct current conversion circuit 200a is configured to connect to the photovoltaic array 100, a first output end of the direct current/direct current conversion circuit 200a is connected to the first end of the neutral bus M, and a second output end of the direct current/direct current conversion circuit 200a is connected to the first end of the direct current negative bus BUS−.

A first input end of the positive voltage generation circuit 200c is connected to the first output end of the direct current/direct current conversion circuit 200a, a second input end of the positive voltage generation circuit 200c is connected to the second output end of the direct current/direct current conversion circuit 200a, a first output end of the positive voltage generation circuit 200c is connected to the first end of the direct current positive bus BUS+, and a second output end of the positive voltage generation circuit 200c is connected to the first end of the neutral bus M.

The positive voltage generation circuit 200c is configured to convert an output voltage of the direct current/direct current conversion circuit 200a into a positive voltage for output.

For example, the output voltage of the direct current/direct current conversion circuit 200a is −1500 V to 0 V, and output of the positive voltage generation circuit is 0 V to 1500 V. That is, the voltage of M is 0 V, the voltage of BUS+ is 1500 V, and the voltage of BUS− is −1500 V.

The following describes a startup control process in which the bipolar photovoltaic system includes the positive voltage generation circuit. The following uses three startup time sequences as an example.

A First Startup Control Mode.

The controller 500 is configured to: in the startup process, first control the direct current/direct current conversion circuit 200a and the second inverter 400 to turn on, and then control the voltage regulation circuit 600 to turn on, that is, control a potential difference between M and the ground to be within a specific range, that is, the voltage to ground of M to be less than or equal to the preset voltage threshold; and then control the positive voltage generation circuit 200c to turn on, and finally control the first inverter 300 to turn on.

A Second Startup Control Mode.

The controller is configured to: in the startup process, first control the direct current/direct current conversion circuit 200a to turn on, and then control the voltage regulation circuit 600 to turn on, that is, control a potential difference between M and the ground to be within a specific range, that is, the voltage to ground of M to be less than or equal to the preset voltage threshold; and then control the positive voltage generation circuit 200c to turn on, and finally control the first inverter 300 and the second inverter 400 to turn on.

A Third Startup Control Mode.

The controller is configured to: in the startup process, first control the first inverter 300 to turn on, and then control the voltage regulation circuit 600 to turn on, that is, control a potential difference between M and the ground to be within a specific range, that is, the voltage to ground of M to be less than or equal to the preset voltage threshold; and then control the second inverter 400 to turn on, and finally control the positive voltage generation circuit 200c and the direct current/direct current conversion circuit 200a to turn on.

The following describes a shutdown control process when the bipolar photovoltaic system includes the positive voltage generation circuit.

A First Shutdown Control Mode.

The controller 500 is configured to: in the shutdown process, first control the first inverter 300 and the positive voltage generation circuit 200c to turn off, then control the second inverter and the direct current/direct current conversion circuit 200a to turn off, and finally control the voltage regulation circuit 600 to turn off.

A Second Shutdown Control Mode.

The controller is configured to: in the shutdown process, first control the first inverter 300 and the second inverter 400 to turn off, then control the positive voltage generation circuit 200c and the direct current/direct current conversion circuit 200a to turn off, and finally control the voltage regulation circuit 600 to turn off.

The foregoing is merely an example to describe two different shutdown sequences, and another shutdown sequence may also be used. However, in the shutdown process, it needs to be ensured that the voltages to ground of the three direct current buses BUS+, M, and BUS− each are less than or equal to the preset voltage threshold, and no overvoltage occurs.

It should be noted that, in this embodiment, in addition to monitoring the voltage to prevent the overvoltage, a magnitude of a ground leakage current of each direct current bus may be further monitored. When the leakage current exceeds a preset limit, it indicates that a ground insulation fault occurs, and the devices also need to be turned off. In addition, the direct current bus may be discharged by using a discharging circuit, to ensure that the voltages to ground of the three direct current buses drop to below the preset voltage threshold within a time required by a production compliance.

In the foregoing embodiment, that the bipolar photovoltaic system may include the discharging circuit when including the negative voltage generation circuit is described. The following describes an implementation in which the bipolar photovoltaic system may also include a discharging circuit when including the positive voltage generation circuit.

Figure 9:
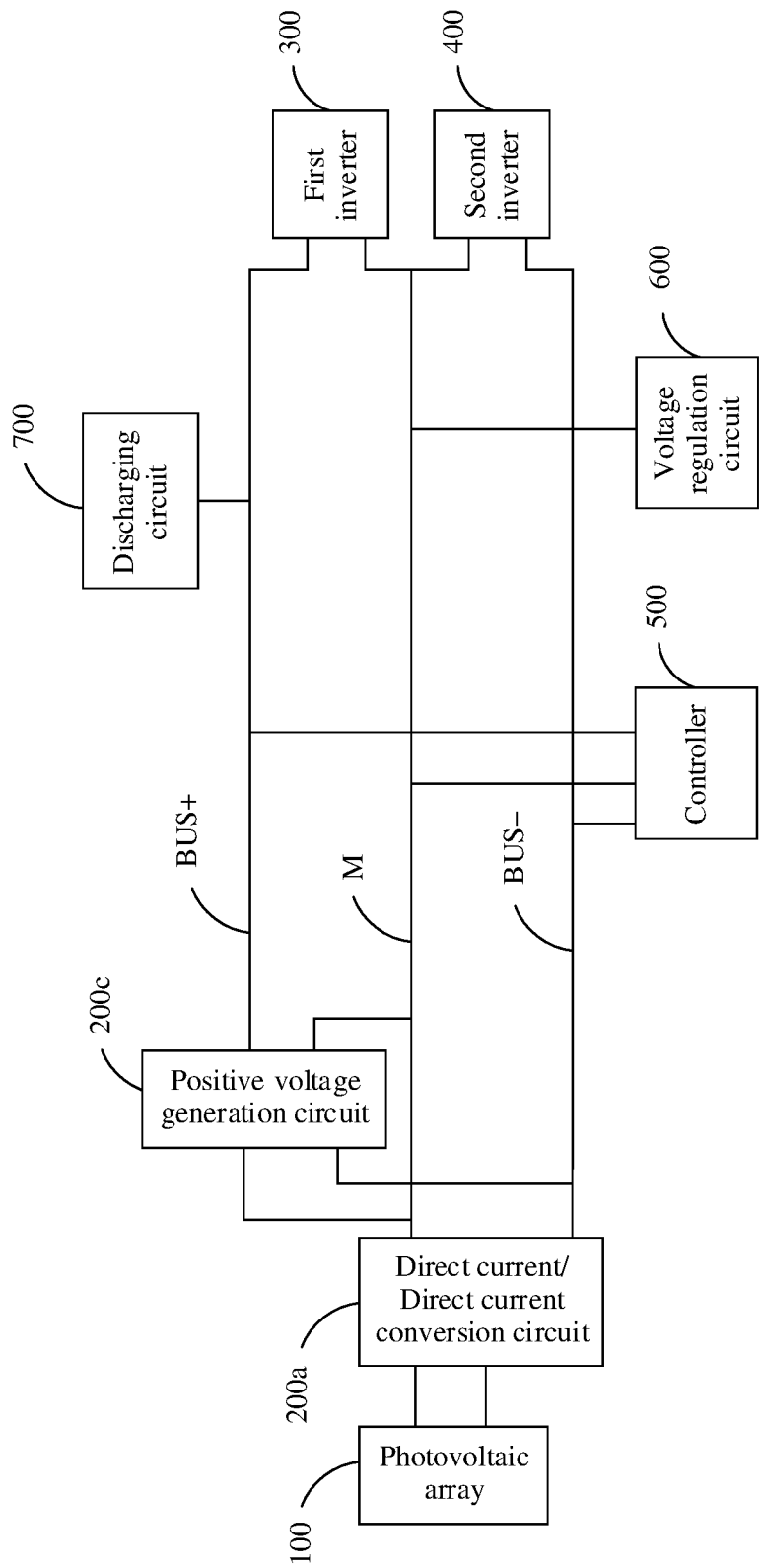
FIG. 9 is a schematic diagram of another photovoltaic system according to an embodiment.

FIG. 9 is a schematic diagram of another bipolar photovoltaic system according to an embodiment.

The bipolar photovoltaic system provided in this embodiment further includes the positive voltage generation circuit 200c and a discharging circuit 700.

In an implementation, the discharging circuit 700 may be connected to the direct current positive bus BUS+ or the direct current negative bus BUS− by using a switch. In FIG. 9, an example in which the discharging circuit 700 is connected to BUS+ is used for description. In addition, for another implementation of the discharging circuit 700, reference may be made to the description of the embodiment corresponding to the negative voltage generation circuit, which is also applicable to the embodiment of the discharging circuit corresponding to the positive voltage generation circuit. Details are not described herein again. When the discharging circuit 700 is connected to the direct current bus by using the switch, and discharge does not need to be performed, the switch may be controlled to turn off, so that the discharging circuit 700 is disconnected from the direct current bus, thereby reducing losses.

It should be noted that, in this embodiment, specific implementations of the negative voltage generation circuit and the positive voltage generation circuit are not limited, that is, both are conversion circuits for converting a direct current into a direct current. For the negative voltage generation circuit, a transformation ratio of voltage conversion of the negative voltage generation circuit is 1:−1. For the positive voltage generation circuit, a transformation ratio of voltage conversion of the positive voltage generation circuit is −1:1.

The controller 500 is further configured to: when the voltage to ground of the direct current positive bus BUS+, the voltage to ground of the direct current negative bus BUS−, or the voltage to ground of the neutral bus M is greater than the preset voltage threshold, control the switch to turn on, and control the discharging circuit to discharge. An implementation is that as long as the switch is turned on, the discharging circuit may automatically discharge an excess charge to the ground without special control. An implementation form of the discharging circuit is not limited in the foregoing embodiments, and the discharging circuit may be any circuit that can implement discharge.

The discharging circuit 700 described in the foregoing embodiments may be in the system corresponding to the positive voltage generation circuit, or may be in the system of the negative voltage generation circuit.

The following describes a specific implementation in which the direct current/direct current conversion circuit in the power converter is a boost conversion circuit.

Figure 10:
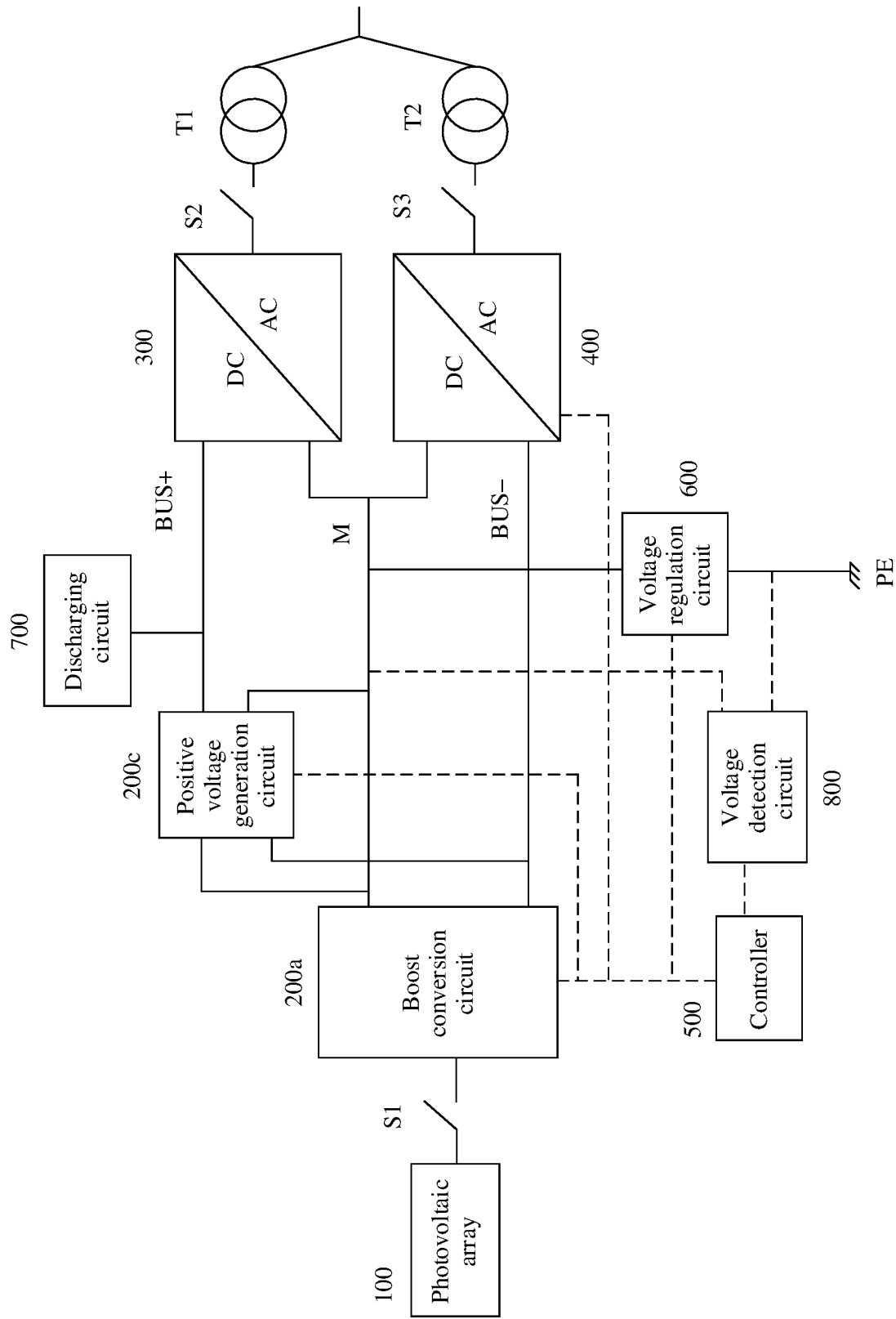
FIG. 10 is a schematic diagram of still another photovoltaic system according to an embodiment.

FIG. 10 is a schematic diagram of still another bipolar photovoltaic system according to an embodiment.

In the photovoltaic system provided in this embodiment, the direct current/direct current conversion circuit in the power converter includes at least a boost conversion circuit 200a. For example, the boost conversion circuit 200a may be a boost circuit. A specific implementation form of the boost conversion circuit 200a is not limited in this embodiment. For example, when the photovoltaic system includes a combiner box, the boost conversion circuit 200a may be located inside the combiner box. The discharging circuit 700 is connected to the direct current positive bus BUS+.

The photovoltaic system further includes a first isolating switch S1. The first isolating switch S1 is connected between the boost conversion circuit 200a and the photovoltaic array 100.

In another implementation case, a second isolating switch S2 and a third isolating switch S3 may be further included.

The second isolating switch S2 is connected between the output end of the first inverter (DC/AC, Direct Current/Alternating Current) 300 and a corresponding isolation transformer, and the third isolating switch S3 is connected between the output end of the second inverter (DC/AC) 400 and a corresponding isolation transformer. For example, the first inverter 300 corresponds to a first isolation transformer T1, and the second inverter 400 corresponds to a second isolation transformer T2. In a possible implementation, both the first isolation transformer T1 and the second isolation transformer T2 are connected to an alternating current grid, to implement feeding of photovoltaic power generation to the alternating current grid.

The controller 500 is configured to: when the voltage to ground of the direct current positive bus BUS+, the voltage to ground of the direct current negative bus BUS−, or the voltage to ground of the neutral bus M is greater than the preset voltage threshold, control all of the first isolating switch S1, the second isolating switch S2, and the third isolating switch S3 to turn off, and control the discharging circuit 700 to discharge the direct current positive bus BUS+. Therefore, the voltages to ground of BUS+, BUS−, and M are reduced to below the preset voltage threshold.

In the bipolar photovoltaic system provided in the foregoing embodiments, because the three direct current buses are included, which are BUS+, BUS−, and M, a system production compliance only needs to be set according to half of a maximum voltage of the direct current bus. This reduces the production compliance requirement and improves the voltage of the direct current bus. In a case of same power, a current of the direct current bus can be reduced, losses can be reduced, and power supplying efficiency can be improved. In addition, when the bipolar photovoltaic system includes the negative voltage generation circuit, the potential difference between the neutral bus M and the ground is controlled to be within a specific threshold range (for example, the neutral bus M is grounded by using the voltage regulation circuit), so that an input voltage of the power converter can be kept above the ground potential. For the photovoltaic system, a PID effect can be prevented.

Based on the bipolar photovoltaic system provided in the foregoing embodiments, the bipolar photovoltaic system is described by using the field of photovoltaic power generation technologies as an example. In addition to being applied to the field of photovoltaic power generation technologies, the bipolar photovoltaic system may be further applied to the field of wind power generation and energy storage technologies, which is described below in detail with reference to the accompanying drawings.

Figure 11:
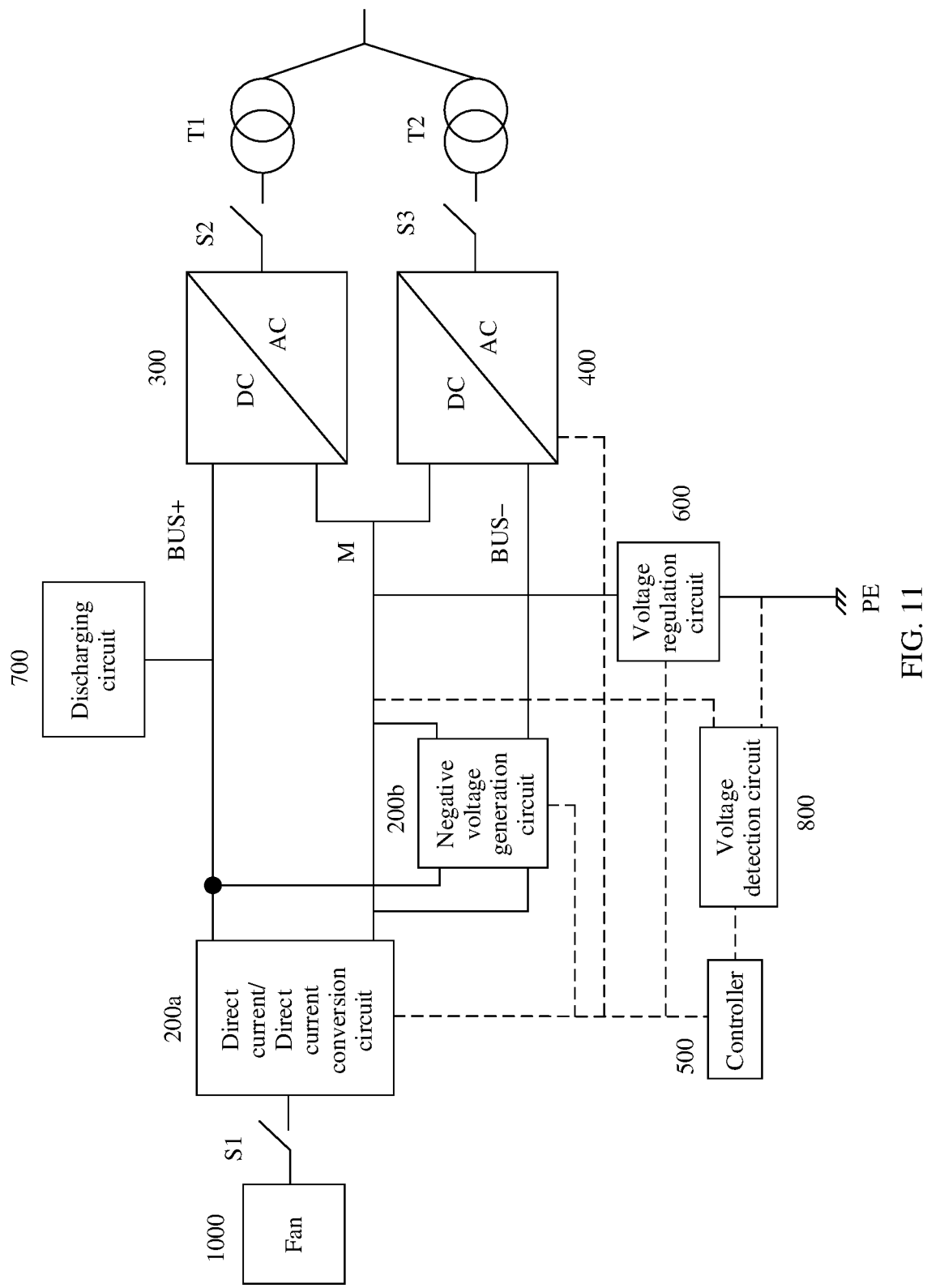
FIG. 11 is a schematic diagram of a fan power generation system according to an embodiment.

FIG. 11 is a schematic diagram of a bipolar fan power generation system according to an embodiment.

In a power supply system provided in this embodiment, a source of a direct current power supply may be renewable energy and non-renewable energy. The renewable energy may be, for example, at least one of photovoltaic power generation, wind power generation, or hydroelectric power. The non-renewable energy may be, for example, an energy storage battery. The direct current power supply in this embodiment does not mean a fan or an energy storage battery itself, but refers to that a source of the direct current power supply is the fan, the energy storage battery, or the like.

The direct current power supply includes three direct current buses and two inverters. In an example, the following is included. A first end of a direct current positive bus is configured to connect to a first output end of the direct current power supply, a first end of a neutral bus is configured to connect to a second output end of the direct current power supply, and a first end of a direct current negative bus is configured to connect to a third output end of the direct current power supply. A first input end of a first inverter is connected to a second end of the direct current positive bus, and a second input end of the first inverter is connected to a second end of the neutral bus. A first input end of a second inverter is connected to the second end of the neutral bus, and a second input end of the second inverter is connected to a second end of the direct current negative bus. A controller is configured to control, in startup and shutdown processes, a voltage to ground of the direct current positive bus, a voltage to ground of the direct current negative bus, and a voltage to ground of the neutral bus each to be less than or equal to a preset voltage threshold.

FIG. 11 shows a bipolar power supply system corresponding to wind power generation. A direct current output by a fan 1000 is provided for BUS+ and M. In this embodiment, an example in which the power supply system includes a negative voltage generation unit 200b is used for description. A specific operating principle is the same as that of the bipolar photovoltaic system described in the foregoing embodiments, and a difference is that only the source of the direct current power supply is replaced with the fan 1000. It may be understood that a power converter may be integrated into the fan 1000 to output a direct current voltage corresponding to the direct current bus.

The fan power supply system provided in this embodiment may further include a voltage regulation circuit 600.

The voltage regulation circuit 600 is connected to any one of the following locations: between the neutral bus M and the ground, between the direct current positive bus BUS+ and the ground, between the direct current negative bus BUS− and the ground, between an output end of a first inverter 300 and the ground, between an output end of a second inverter 400 and the ground, or between an input end of the direct current power supply and the ground.

The direct current power supply includes a direct current/direct current conversion circuit 200a and the negative voltage generation circuit 200b.

An input end of the direct current/direct current conversion circuit 200a is configured to connect to a direct current, a first output end of the direct current/direct current conversion circuit 200a is connected to the first end of the direct current positive bus BUS+, and a second output end of the direct current/direct current conversion circuit 200a is connected to the first end of the neutral bus M.

A first input end of the negative voltage generation circuit 200b is connected to the first output end of the direct current/direct current conversion circuit 200a, a second input end of the negative voltage generation circuit 200b is connected to the second output end of the direct current/direct current conversion circuit 200a, a first output end of the negative voltage generation circuit 200b is connected to the first end of the neutral bus M, and a second output end of the negative voltage generation circuit 200b is connected to the first end of the direct current negative bus BUS−.

The negative voltage generation circuit 200b is configured to convert an output voltage of the direct current/direct current conversion circuit 200a into a negative voltage for output.

The controller 500 is configured to control, in the startup process in any one of the following startup modes, the voltage to ground of the direct current positive bus BUS+, the voltage to ground of the direct current negative bus BUS−, and the voltage to ground of the neutral bus M each to be less than or equal to the preset voltage threshold:

in the startup process, controlling the direct current/direct current conversion circuit 200a and the first inverter 300 to first turn on, then controlling the voltage regulation circuit to turn on, and finally controlling the negative voltage generation circuit 200b to turn on and the second inverter 400 to turn on; or in the startup process, controlling the direct current/direct current conversion circuit 200a to turn on, then controlling the voltage regulation circuit to turn on, then controlling the negative voltage generation circuit to turn on, and finally controlling the first inverter 300 and the second inverter 400 to turn on; or in the startup process, controlling the first inverter 300 to turn on, then controlling the voltage regulation circuit to turn on, then controlling the second inverter 400 to turn on, and finally controlling the negative voltage generation circuit and the direct current/direct current conversion circuit 200a to turn on.

The controller 500 is configured to control, in the startup process in any one of the following shutdown modes, the voltage to ground of the direct current positive bus, the voltage to ground of the direct current negative bus, and the voltage to ground of the neutral bus each to be less than or equal to the preset voltage threshold:

in the shutdown process, controlling the second inverter 400 and the negative voltage generation circuit to turn off, then controlling the first inverter 300 and the direct current/direct current conversion circuit to turn off, and finally controlling the voltage regulation circuit 600 to turn off; or in the shutdown process, controlling the first inverter 300 and the second inverter 400 to turn off, and then controlling the negative voltage generation circuit and the direct current/direct current conversion circuit 200a to turn off, and finally controlling the voltage regulation circuit 600 to turn off. Further, it should be appreciated that, in the embodiments, the term "finally" may be used as in indicator in an order of operations, but should not be understood to mean that there are no other intervening steps before or after.

Figure 12:
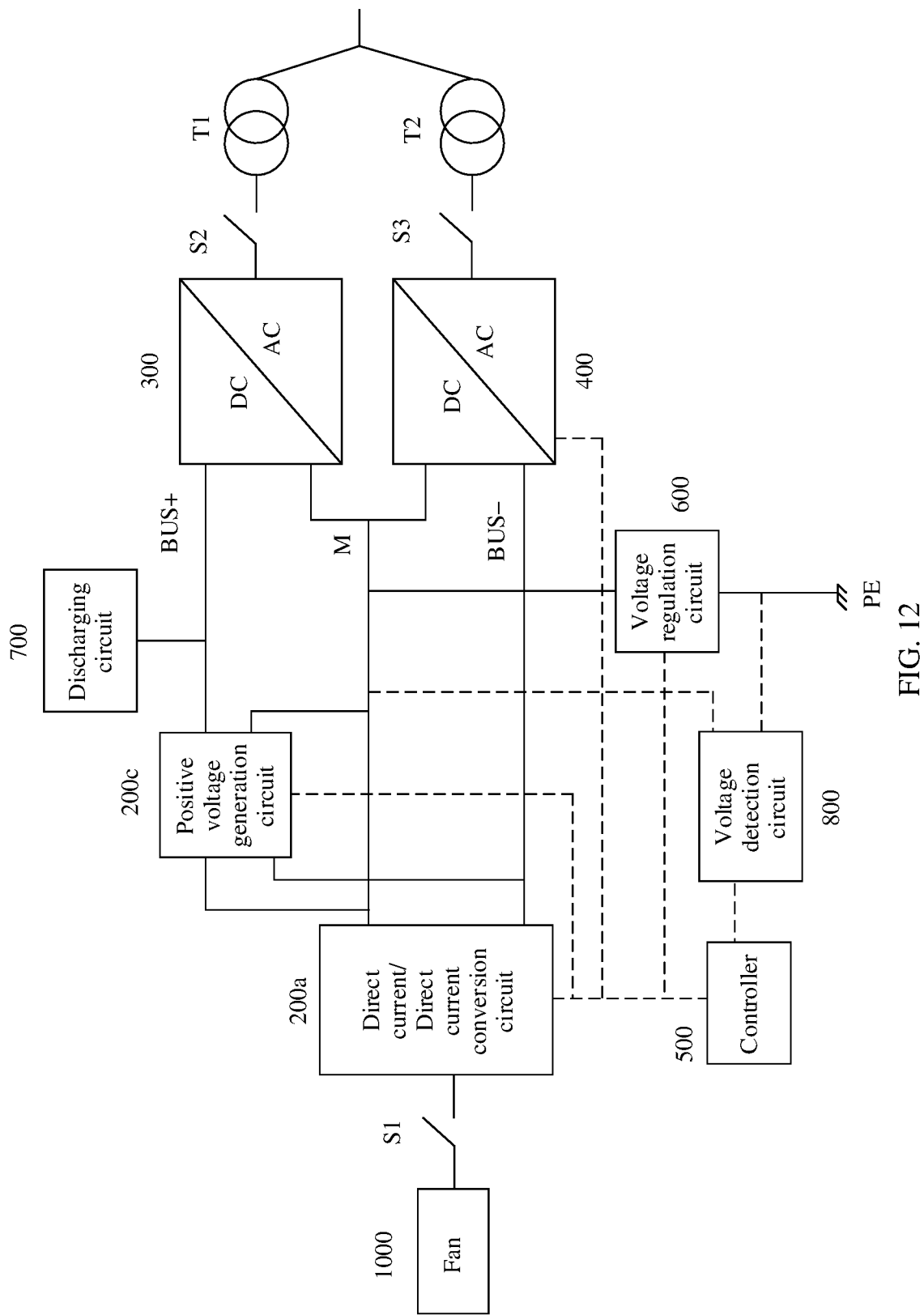
FIG. 12 is a schematic diagram of another fan power generation system according to an embodiment.

FIG. 12 is a schematic diagram of another bipolar fan power generation system according to an embodiment.

A difference between FIG. 12 and FIG. 11 is that a positive voltage generation circuit 200c is included in FIG. 12, and the negative voltage generation circuit 200b is included in FIG. 11.

As shown in FIG. 12, a power converter includes a direct current/direct current conversion circuit 200a and the positive voltage generation circuit 200c.

An input end of the direct current/direct current conversion circuit 200a is configured to connect to a direct current, a first output end of the direct current/direct current conversion circuit 200a is connected to the first end of the neutral bus, and a second output end of the direct current/direct current conversion circuit 200a is connected to the first end of the direct current negative bus.

A first input end of the positive voltage generation circuit 200c is connected to the first output end of the direct current/direct current conversion circuit 200a, a second input end of the positive voltage generation circuit 200c is connected to the second output end of the direct current/direct current conversion circuit 200a, a first output end of the positive voltage generation circuit 200c is connected to the first end of the direct current positive bus BUS+, and a second output end of the positive voltage generation circuit 200c is connected to the first end of the neutral bus M.

The positive voltage generation circuit 200c is configured to convert an output voltage of the direct current/direct current conversion circuit 200a into a positive voltage for output.

The controller 500 is configured to control, in the startup process in any one of the following startup modes, the voltage to ground of the direct current positive bus BUS+, the voltage to ground of the direct current negative bus BUS−, and the voltage to ground of the neutral bus M each to be less than or equal to the preset voltage threshold.

In a first startup mode, the direct current/direct current conversion circuit 200a and the second inverter 400 are controlled to turn on, then the voltage regulation circuit 600 is controlled to turn on, then the positive voltage generation circuit 200c is controlled to turn on, and finally the first inverter 300 is turned on.

Alternatively, in a second startup mode, the direct current/direct current conversion circuit 200a is controlled to turn on, then the voltage regulation circuit 600 is controlled to turn on, then the positive voltage generation circuit 200c is controlled to turn on, and finally the first inverter 300 and the second inverter 400 are controlled to turn on.

Alternatively, in a third startup mode, the first inverter 300 is controlled to turn on, then the voltage regulation circuit 600 is controlled to turn on, then the second inverter 400 is controlled to turn on, and finally the positive voltage generation circuit 200c and the direct current/direct current conversion circuit 200a are controlled to turn on.

The controller 500 is configured to control, in the shutdown process in any one of the following shutdown modes, the voltage to ground of the direct current positive bus BUS+, the voltage to ground of the direct current negative bus BUS−, and the voltage to ground of the neutral bus M each to be less than or equal to the preset voltage threshold.

In a first shutdown mode, the first inverter 300 and the positive voltage generation circuit are controlled to turn off, then the second inverter 400 and the direct current/direct current conversion circuit 200a are controlled to turn off, and finally the voltage regulation circuit 600 is controlled to turn off.

Alternatively, in a second shutdown mode, the first inverter 300 and the second inverter 400 are controlled to turn off, then the positive voltage generation circuit and the direct current/direct current conversion circuit 200a are controlled to turn off, and finally the voltage regulation circuit is controlled to turn off.

The bipolar power supply system corresponding to the fan is described in both FIG. 11 and FIG. 12. A bipolar power supply system corresponding to the energy storage battery is described below with reference to FIG. 13 and FIG. 14.

Figure 13:
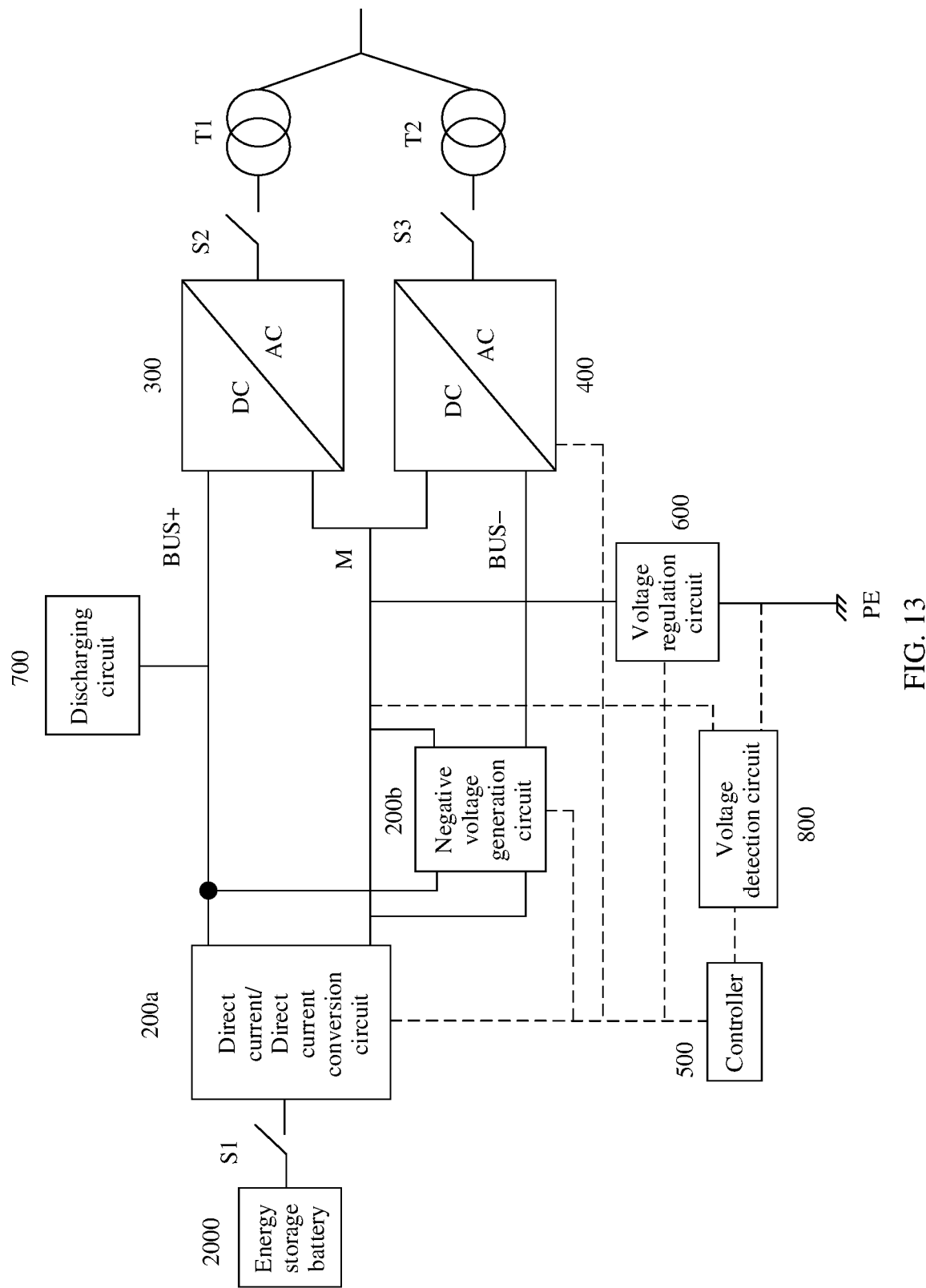
FIG. 13 is a schematic diagram of an energy storage power supply system according to an embodiment.

FIG. 13 is a schematic diagram of a bipolar energy storage power supply system according to an embodiment.

Figure 14:
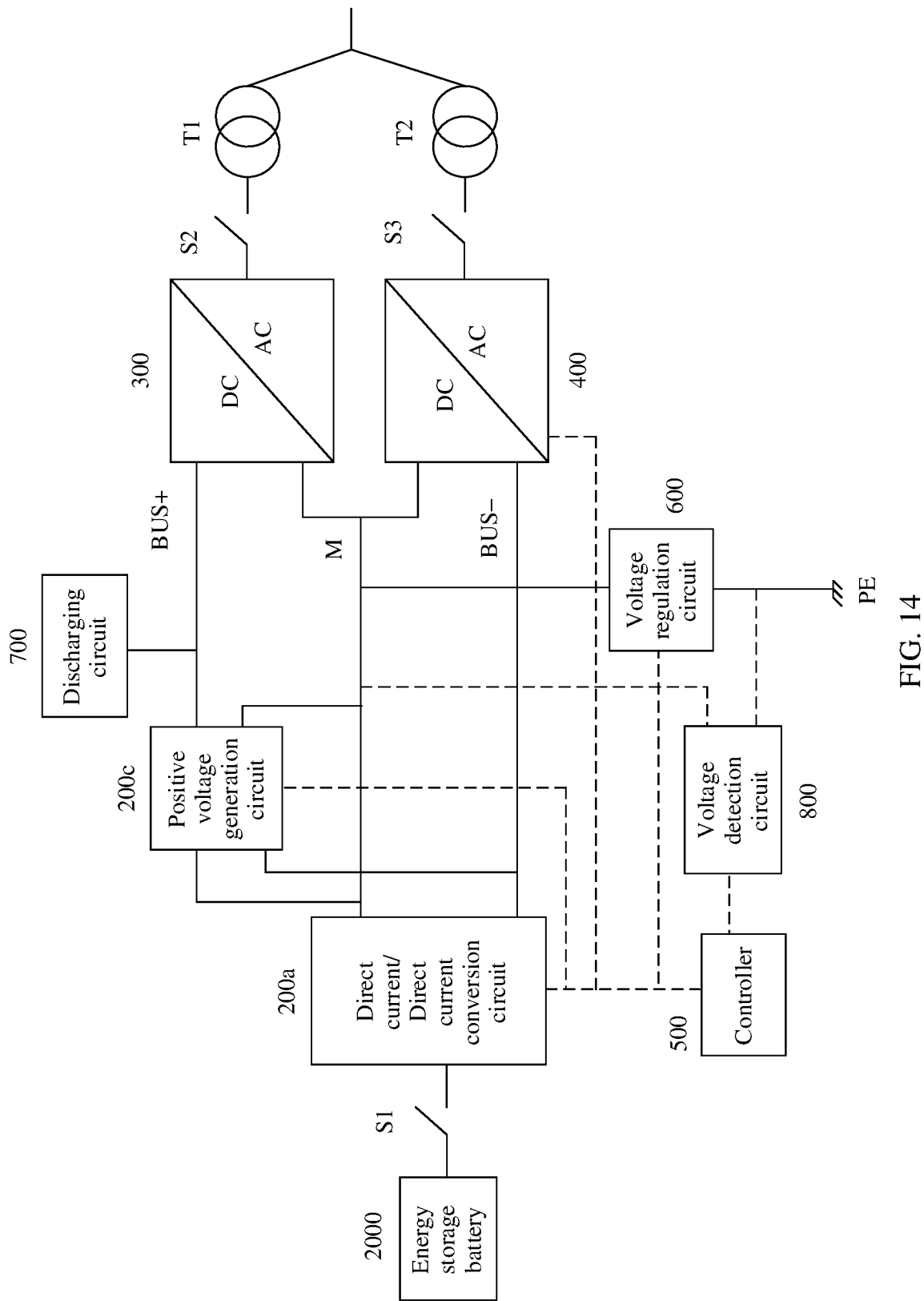
FIG. 14 is a schematic diagram of another energy storage power supply system according to an embodiment.

FIG. 14 is a schematic diagram of another bipolar energy storage power supply system according to an embodiment.

A difference between FIG. 13 and FIG. 14 is that in FIG. 13, the bipolar power supply system corresponding to an energy storage battery 2000 includes a negative voltage generation circuit 200b, and in FIG. 14, the bipolar power supply system corresponding to an energy storage battery 2000 includes a positive voltage generation circuit 200c.

The foregoing startup control and shutdown control solutions of the fan power supply system are all applicable to the power supply system corresponding to the energy storage battery. For details, refer to the foregoing descriptions. Details are not described herein again.

It should be noted that the power converter, the two inverters, and the isolation transformer in the foregoing embodiments may implement bidirectional operating, that is, may supply power from a direct current power supply side to an alternating current power grid side, and may also implement charging from the alternating current power grid side to the direct current power supply side.

Based on the bipolar photovoltaic system provided in the foregoing embodiments, an embodiment further provides a control method for a bipolar photovoltaic system, which is described in detail below with reference to the accompanying drawing.

Figure 15:
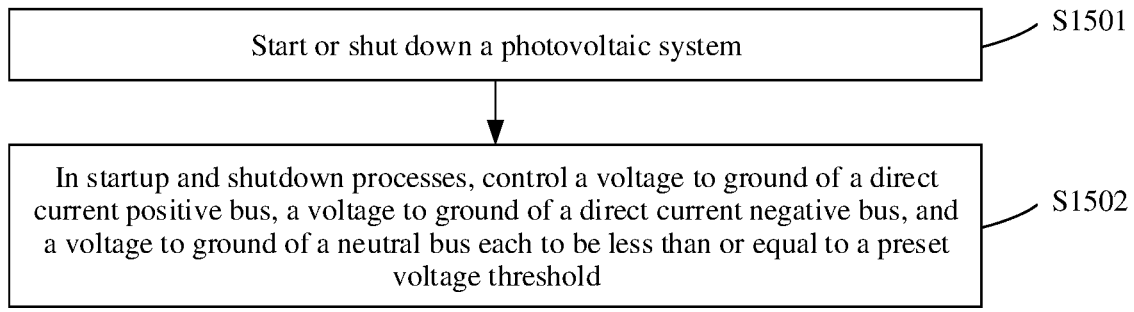
FIG. 15 is a flowchart of a control method for a photovoltaic system according to an embodiment.

FIG. 15 is a flowchart of a control method for a bipolar photovoltaic system according to an embodiment.

The control method for a bipolar photovoltaic system provided in this embodiment applicable to the bipolar photovoltaic system provided in the foregoing embodiments. The bipolar photovoltaic system includes: An input end of a power converter is configured to connect to a photovoltaic array, a first output end of the power converter is connected to a first end of a direct current positive bus, a second output end of the power converter is connected to a first end of a neutral bus, and a third output end of the power converter is connected to a first end of a direct current negative bus; a first input end of a first inverter is connected to a second end of the direct current positive bus, and a second input end of the first inverter is connected to a second end of the neutral bus; and a first input end of a second inverter is connected to the second end of the neutral bus, and a second input end of the second inverter is connected to a second end of the direct current negative bus. For a specific operating principle, refer to the descriptions in embodiments of the photovoltaic system. Details are not described herein again.

The control method for a photovoltaic system is a method for controlling startup and shutdown of the photovoltaic system, including:

S1501: Start or shut down the photovoltaic system.

S1502: In startup and shutdown processes, control a voltage to ground of the direct current positive bus, a voltage to ground of the direct current negative bus, and a voltage to ground of the neutral bus each to be less than or equal to a preset voltage threshold.

According to the control method provided in this embodiment, regardless of whether the photovoltaic system is in the startup process or in the shutdown process, regardless of a time sequence of a sequential action of each component, it needs to be ensured, through controlling, that the voltages to ground of BUS+, BUS−, and M each are less than or equal to the preset voltage threshold in any case.

In addition, to meet a production compliance requirement, in a running process of the photovoltaic system, it also needs to detect a voltage to ground of each direct current bus, and to control a voltage to ground of the direct current positive bus, a voltage to ground of the direct current negative bus, and a voltage to ground of the neutral bus each to be less than or equal to the preset voltage threshold.

With reference to the accompanying drawings, the following separately describes startup and shutdown control when the bipolar photovoltaic system includes a negative voltage generation circuit and a positive voltage generation circuit.

First, a startup control process of the bipolar photovoltaic system including the negative voltage generation circuit is described. Correspondingly, the corresponding bipolar photovoltaic system further includes a voltage regulation circuit connected between ground and any one of the direct current positive bus, the direct current negative bus, the neutral bus, the input end of the power converter, an output end of the first inverter, or an output end of the second inverter; and the power converter includes a direct current/direct current conversion circuit and the negative voltage generation circuit.

Figure 16:
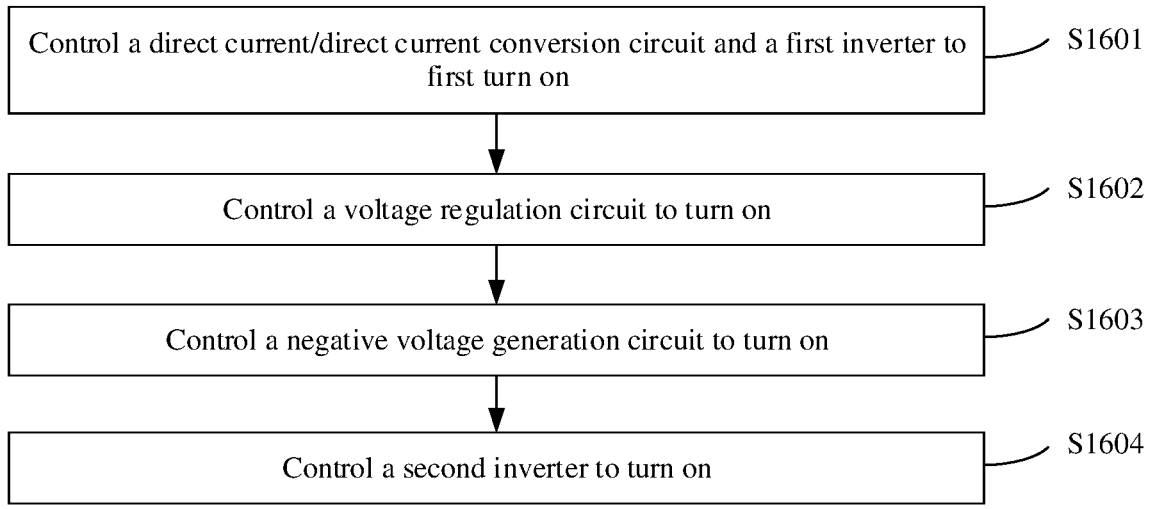
FIG. 16 is a flowchart of a startup control method according to an embodiment.

FIG. 16 is a flowchart of a startup control method according to an embodiment.

Controlling a voltage to ground of the direct current positive bus, a voltage to ground of the direct current negative bus, and a voltage to ground of the neutral bus each to be less than or equal to a preset voltage threshold includes:

S1601: Control the direct current/direct current conversion circuit and the first inverter to first turn on.
That is, the direct current positive bus BUS+ is first turned on, and the voltage of the direct current positive bus BUS+ is maintained, that is, a positive half bus runs.

S1602: Control the voltage regulation circuit to turn on. A voltage between M and the ground is within a specific range, that is, the voltage to ground of M is less than or equal to the preset voltage threshold.

S1603: Control the negative voltage generation circuit to turn on. That is, a voltage of the direct current negative bus BUS− is finally generated.

S1604: Control the second inverter to turn on.

It should be noted that S1601 to S1604 have a sequence, that is, S1601 is first performed, then S1602 is performed, then S1603 is performed, and finally S1604 is performed.

The following describes another startup control mode.

Figure 17:
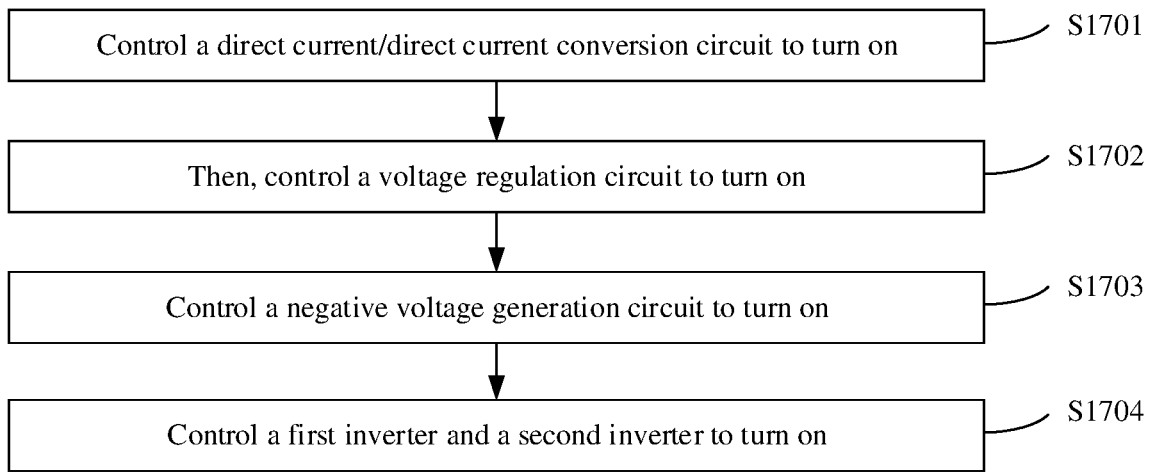
FIG. 17 is a flowchart of another startup control method according to an embodiment.

FIG. 17 is a flowchart of another startup control method according to an embodiment.

Controlling a voltage to ground of the direct current positive bus, a voltage to ground of the direct current negative bus, and a voltage to ground of the neutral bus each to be less than or equal to a preset voltage threshold includes:

S1701: Control the direct current/direct current conversion circuit to turn on.

S1702: Then, control the voltage regulation circuit to turn on. That is, a potential difference between M and the ground is controlled within a specific range, that is, the voltage to ground of M is less than or equal to the preset voltage threshold.

S1703: Then, control the negative voltage generation circuit to turn on. That is, a voltage of the direct current negative bus BUS− is finally generated.

S1704: Control the first inverter and the second inverter to turn on.

It should be noted that S1701 to S1704 have a sequence, that is, S1701 is first performed, then S1702 is performed, then S1703 is performed, and finally S1704 is performed.

The following describes another startup mode.

Figure 18:
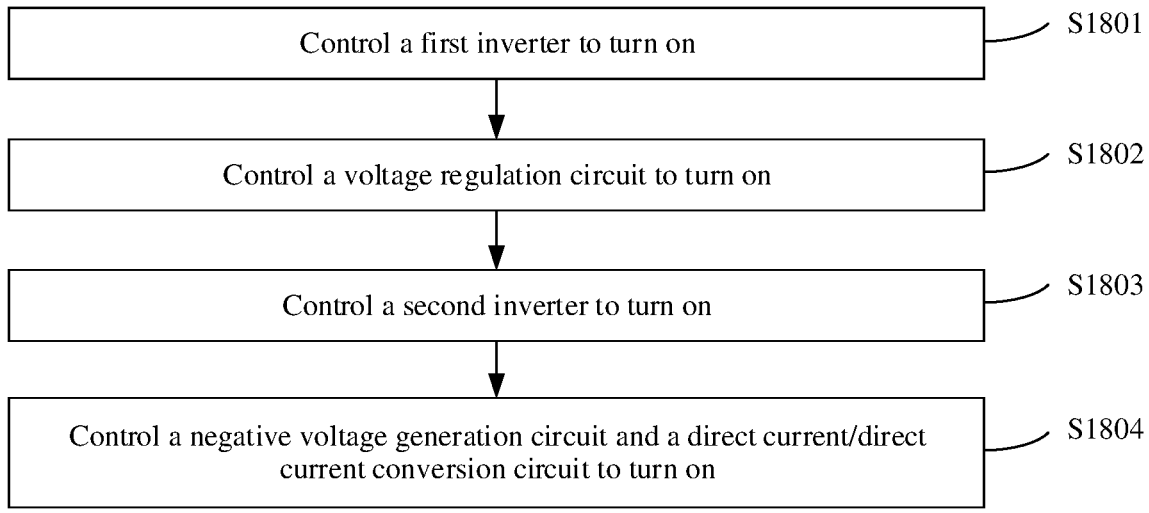
FIG. 18 is a flowchart of still another startup control method according to an embodiment.

FIG. 18 is a flowchart of still another startup control method according to an embodiment.

Controlling a voltage to ground of the direct current positive bus, a voltage to ground of the direct current negative bus, and a voltage to ground of the neutral bus each to be less than or equal to a preset voltage threshold includes:

S1801: Control the first inverter to turn on. That is, a right side corresponding to a half bus is first turned on.

S1802: Control the voltage regulation circuit to turn on. That is, a potential difference between M and the ground is controlled within a specific range, that is, the voltage to ground of M is less than or equal to the preset voltage threshold.

S1803: Control the second inverter to turn on. That is, a voltage of the direct current negative bus BUS− is finally generated.

S1804: Control the negative voltage generation circuit and the direct current/direct current conversion circuit to turn on.

It should be noted that S1801 to S1804 have a sequence, that is, S1801 is first performed, then S1802 is performed, then S1803 is performed, and finally S1804 is performed.

The foregoing describes three startup modes corresponding to the bipolar photovoltaic system including the negative voltage generation circuit. It should be understood that, in addition to the foregoing three startup modes, there may be another startup mode. This is not limited in this embodiment, provided that in the startup process, it is ensured that the voltages to ground of the three direct current buses are no overvoltage. For example, in another startup time sequence, the voltage regulation circuit is first turned on, and after the voltage regulation circuit is turned on, a potential to ground of M is clamped. In this case, all other devices may be then turned on, for example, the first inverter and the second inverter are turned on, and the negative voltage generation circuit and the direct current/direct current conversion circuit are turned on.

The following describes two shutdown modes corresponding to the bipolar photovoltaic system including the negative voltage generation circuit.

Figure 19:
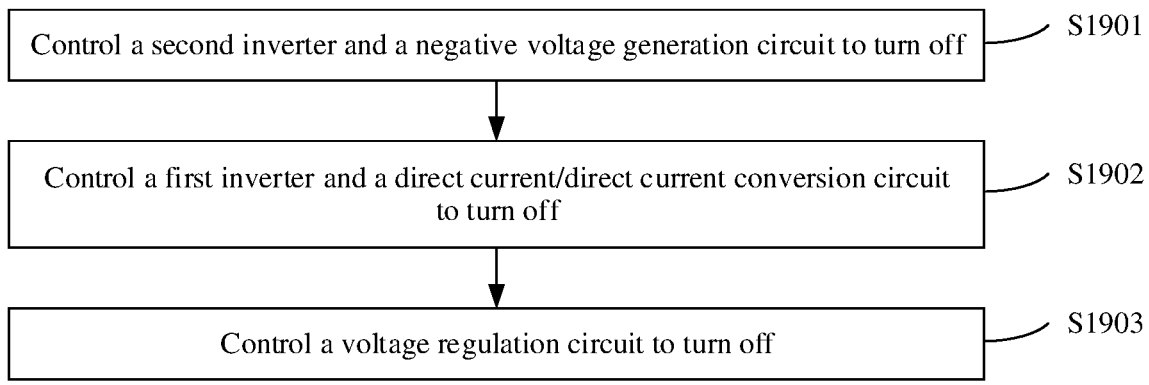
FIG. 19 is a flowchart of a shutdown control method according to an embodiment.

FIG. 19 is a flowchart of a shutdown control method according to an embodiment.

In the shutdown process, controlling a voltage to ground of the direct current positive bus, a voltage to ground of the direct current negative bus, and a voltage to ground of the neutral bus each to be less than or equal to a preset voltage threshold includes:

S1901: Control the second inverter and the negative voltage generation circuit to turn off.

After the second inverter and the negative voltage generation circuit are turned off, the direct current negative bus is discharged through self-power consumption or by using a discharging circuit. When the voltage of the direct current negative bus drops to a safety threshold, S1902 is performed. It should be noted that, that the voltage of the direct current negative bus drops to the safety threshold herein means that the voltage does not need to drop to a same potential as the ground, and the safety threshold herein is less than the preset voltage threshold described above. For example, for a half bus voltage of 1500 V, the preset voltage threshold may be set to 1200 V. That the direct current negative bus drops to the safety threshold herein may be dropping to about 300 V. Then, the first inverter and the direct current/direct current conversion circuit are controlled to turn off.

S1902: Control the first inverter and the direct current/direct current conversion circuit to turn off.

S1903: Control the voltage regulation circuit to turn off.

It should be noted that S1901 to S1903 have a sequence, that is, S1901 is first performed, then S1902 is performed, and finally S1903 is performed.

Figure 20:
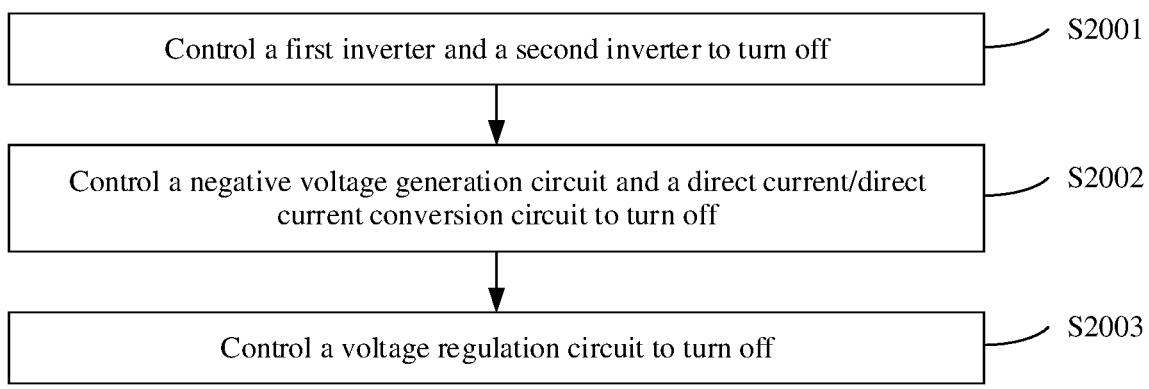
FIG. 20 is a flowchart of still another shutdown control method according to an embodiment.

FIG. 20 is a flowchart of still another shutdown control method according to an embodiment.

In the shutdown process, controlling a voltage to ground of the direct current positive bus, a voltage to ground of the direct current negative bus, and a voltage to ground of the neutral bus each to be less than or equal to a preset voltage threshold includes:

S2001: Control the first inverter and the second inverter to turn off.

S2002: Control the negative voltage generation circuit and the direct current/direct current conversion circuit to turn off.

When the negative voltage generation circuit and the direct current/direct current conversion circuit are turned off, the direct current negative bus is discharged through self-power consumption or by using a discharging circuit. When the voltage of the direct current negative bus drops to a safety threshold, S2003 is performed.

S2003: Control the voltage regulation circuit to turn off.

It should be noted that S2001 to S2003 have a sequence, that is, S2001 is first performed, then S2002 is performed, and finally S2003 is performed.

The foregoing is merely an example to describe two different shutdown sequences, and another shutdown sequence may also be used. However, in the shutdown process, it needs to be ensured that the voltages to ground of the three direct current buses BUS+, M, and BUS− each are less than or equal to the preset voltage threshold, and no overvoltage occurs.

It should be noted that, in this embodiment, in addition to monitoring the voltage to prevent the overvoltage, a magnitude of a ground leakage current of each direct current bus may be further monitored. When the leakage current exceeds a preset limit, the devices also need to be turned off. In addition, the direct current bus may be discharged by using the discharging circuit, to ensure that the voltages to ground of the three direct current buses drop to below the preset voltage threshold within a time required by a production compliance.

The startup and shutdown processes described above are for a case in which the bipolar photovoltaic system includes the negative voltage generation circuit. The following describes startup and shutdown control methods corresponding to the bipolar photovoltaic system including the positive voltage generation circuit. For example, the bipolar photovoltaic system further includes a voltage regulation circuit connected between ground and any one of the direct current positive bus, the direct current negative bus, the neutral bus, the input end of the power converter, an output end of the first inverter, or an output end of the second inverter; and the power converter includes a direct current/direct current conversion circuit and the positive voltage generation circuit.

Figure 21:
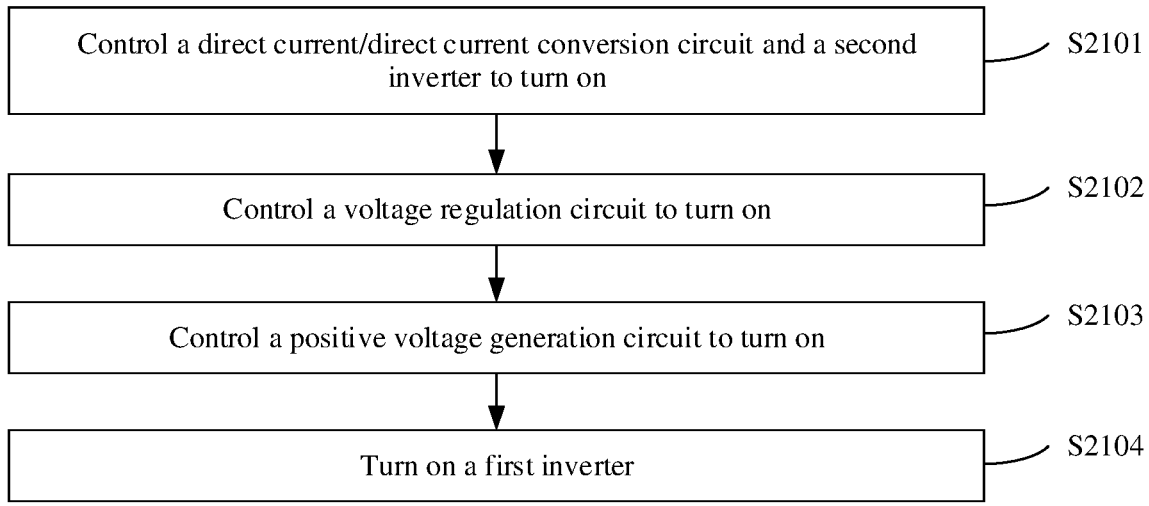
FIG. 21 is a flowchart of still another startup control method according to an embodiment.

FIG. 21 is a flowchart of still another startup control method according to an embodiment.

In the startup process, controlling a voltage to ground of the direct current positive bus, a voltage to ground of the direct current negative bus, and a voltage to ground of the neutral bus each to be less than or equal to a preset voltage threshold includes:

S2101: Control the direct current/direct current conversion circuit and the second inverter to turn on.

S2102: Control the voltage regulation circuit to turn on.

S2103: Control the positive voltage generation circuit to turn on.

S2104: Turn on the first inverter.

It should be noted that S2101 to S2104 have a sequence, that is, S2101 is first performed, then S2102 is performed, then S2103 is performed, and finally S2104 is performed.

Figure 22:
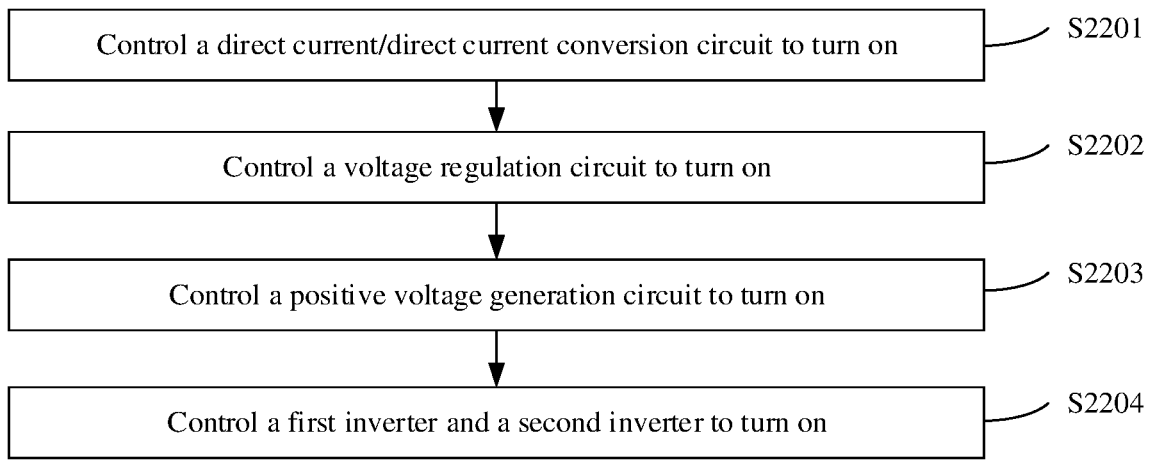
FIG. 22 is a flowchart of still another startup control method according to an embodiment.

FIG. 22 is a flowchart of still another startup control method according to an embodiment.

In the startup process, controlling a voltage to ground of the direct current positive bus, a voltage to ground of the direct current negative bus, and a voltage to ground of the neutral bus each to be less than or equal to a preset voltage threshold includes:

S2201: Control the direct current/direct current conversion circuit to turn on.

S2202: Control the voltage regulation circuit to turn on.

S2203: Control the positive voltage generation circuit to turn on.

S2204: Control the first inverter and the second inverter to turn on.

It should be noted that S2201 to S2204 have a sequence, that is, S2201 is first performed, then S2202 is performed, then S2203 is performed, and finally S2204 is performed.

Figure 23:
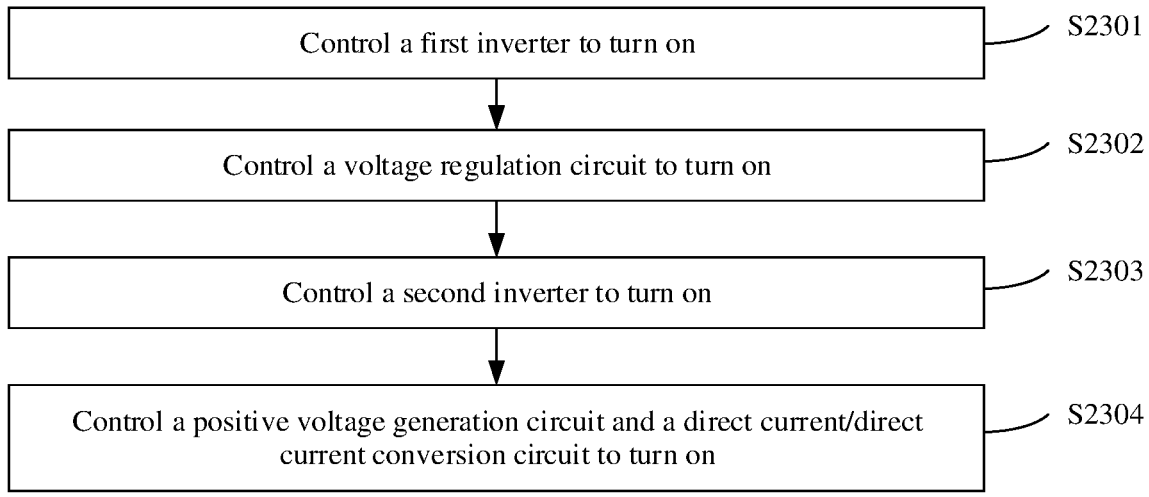
FIG. 23 is a flowchart of still another startup control method according to an embodiment.

FIG. 23 is a flowchart of still another startup control method according to an embodiment.

In the startup process, controlling a voltage to ground of the direct current positive bus, a voltage to ground of the direct current negative bus, and a voltage to ground of the neutral bus each to be less than or equal to a preset voltage threshold includes:

S2301: Control the first inverter to turn on.

S2302: Control the voltage regulation circuit to turn on.

S2303: Control the second inverter to turn on.

S2304: Control the positive voltage generation circuit and the direct current/direct current conversion circuit to turn on.

It should be noted that S2301 to S2304 have a sequence, that is, S2301 is first performed, then S2302 is performed, then S2303 is performed, and finally S2304 is performed.

Figure 24:
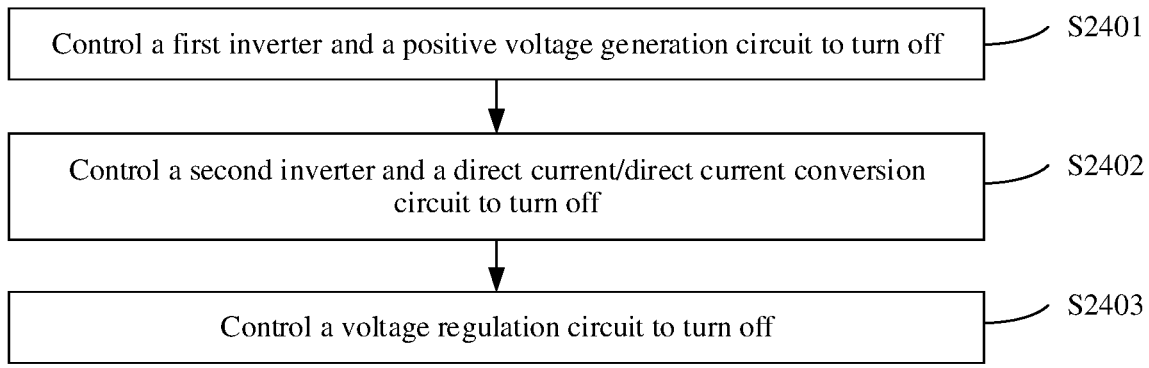
FIG. 24 is a flowchart of a shutdown control method according to an embodiment.

FIG. 24 is a flowchart of a shutdown control method according to an embodiment.

In the shutdown process, controlling a voltage to ground of the direct current positive bus, a voltage to ground of the direct current negative bus, and a voltage to ground of the neutral bus each to be less than or equal to a preset voltage threshold includes:

S2401: Control the first inverter and the positive voltage generation circuit to turn off.

S2402: Control the second inverter and the direct current/direct current conversion circuit to turn off.

S2403: Control the voltage regulation circuit to turn off.

It should be noted that S2401 to S2403 have a sequence, that is, S2401 is first performed, then S2402 is performed, and finally S2403 is performed.

Figure 25:
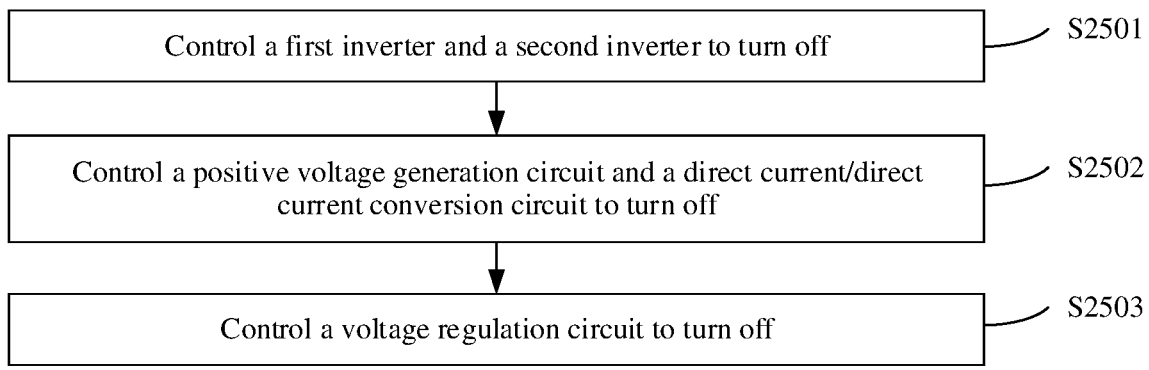
FIG. 25 is a flowchart of still another shutdown control method according to an embodiment.

FIG. 25 is a flowchart of still another shutdown control method according to an embodiment.

In the shutdown process, controlling a voltage to ground of the direct current positive bus, a voltage to ground of the direct current negative bus, and a voltage to ground of the neutral bus each to be less than or equal to a preset voltage threshold includes:

S2501: Control the first inverter and the second inverter to turn off.

S2502: Control the positive voltage generation circuit and the direct current/direct current conversion circuit to turn off.

S2503: Control the voltage regulation circuit to turn off.

It should be noted that S2501 to S2503 have a sequence, that is, S2501 is first performed, then S2502 is performed, and finally S2503 is performed.

In the bipolar photovoltaic system provided in embodiments, during normal running, the voltage between M and the ground is controlled within a safe voltage range, so that a voltage to ground of the entire photovoltaic system does not exceed a maximum voltage specified by the system. However, when a fault occurs, for example, when BUS– is short-circuited to the ground, the voltage to ground of BUS+ is raised to the voltage of the entire direct current bus. In this case, the voltage to ground of BUS+ exceeds the maximum voltage allowed by the system. Therefore, measures need to be taken to reduce the voltage to ground of the entire system to below the preset voltage threshold within the time required by the production compliance. Specific measures may be to quickly turn off the components and simultaneously discharge the direct current bus by using the discharging circuit.

It should be understood that, in the embodiments, "at least one (item)" means one or more, and "a plurality of" means two or more. "And/Or" is used to describe an association relationship between associated objects, and indicates that three types of relationships may exist. For example, "A and/or B" may represent the following three cases: only A exists, only B exists, and both A and B exist, where A and B may be singular or plural. The character "/" usually indicates an "or" relationship between associated objects. "At least one of the following items (pieces)" or a similar expression thereof refers to any combination of these items, including any combination of singular items (pieces) or plural items (pieces). For example, at least one of a, b, or c may represent a, b, c, "a and b", "a and c", "b and c", or "a, b, and c", where a, b, and c may be a singular or plural.

In the foregoing descriptions, the foregoing embodiments are merely used to describe the solutions of the embodiments, but are not limiting. Although described in detail with reference to the foregoing embodiments, persons of ordinary skill in the art should understand that they may still modify the solutions described in the foregoing embodiments, or perform equivalent replacement on some of the features. However, these modifications or replacements do not make the essence of the corresponding solutions depart from the scope of the solutions in the embodiments.

The invention claimed is:

1. A photovoltaic system, comprising: a first inverter, a second inverter, and a controller, wherein
a first end of a direct current positive bus, a first end of a neutral bus, and a first end of a direct current negative bus are all configured to connect to a photovoltaic array;
a first input end of the first inverter is connected to a second end of the direct current positive bus, and a second input end of the first inverter is connected to a second end of the neutral bus;
a first input end of the second inverter is connected to the second end of the neutral bus, and a second input end of the second inverter is connected to a second end of the direct current negative bus; and
the controller is configured to control, in startup and shutdown processes of the photovoltaic system, a voltage to ground of the direct current positive bus, a voltage to ground of the direct current negative bus, and a voltage to ground of the neutral bus each to be less than or equal to a preset voltage threshold.

2. The photovoltaic system according to claim 1, further comprising:
a power converter, and
a voltage regulation circuit, wherein
an input end of the power converter is connected to the photovoltaic array, a first output end of the power converter is connected to the first end of the direct current positive bus, a second output end of the power converter is connected to the first end of the neutral bus, and a third output end of the power converter is connected to the first end of the direct current negative bus; and
the voltage regulation circuit is connected: between the neutral bus and the ground, between the direct current positive bus and the ground, between the direct current negative bus and the ground, between an output end of the first inverter and the ground, between an output end of the second inverter and the ground, or between the input end of the power converter and the ground.

3. The photovoltaic system according to claim 2, wherein the power converter comprises a direct current/direct current conversion circuit and a negative voltage generation circuit;
an input end of the direct current/direct current conversion circuit is configured to connect to the photovoltaic array, a first output end of the direct current/direct current conversion circuit is connected to the first end of the direct current positive bus, and a second output end of the direct current/direct current conversion circuit is connected to the first end of the neutral bus;
a first input end of the negative voltage generation circuit is connected to the first output end of the direct current/direct current conversion circuit, a second input end of the negative voltage generation circuit is connected to the second output end of the direct current/direct current conversion circuit, a first output end of the negative voltage generation circuit is connected to the first end of the neutral bus, and a second output end of the negative voltage generation circuit is connected to the first end of the direct current negative bus; and the negative voltage generation circuit is configured to convert an output voltage of the direct current/direct current conversion circuit into a negative voltage for output.

4. The photovoltaic system according to claim 3, wherein the controller is configured to: in the startup process, control the direct current/direct current conversion circuit and the first inverter to first turn on, then control the voltage regulation circuit to turn on, and then control the negative voltage generation circuit to turn on and the second inverter to turn on.

5. The photovoltaic system according to claim 3, wherein the controller is configured to: in the startup process, control the direct current/direct current conversion circuit to turn on, then control the voltage regulation circuit to turn on, then control the negative voltage generation circuit to turn on, and then control the first inverter and the second inverter to turn on.

6. The photovoltaic system according to claim 3, wherein the controller is configured to: in the startup process, first control the first inverter to turn on, then control the voltage regulation circuit to turn on, then control the second inverter to turn on, and finally control the negative voltage generation circuit and the direct current/direct current conversion circuit to turn on.

7. The photovoltaic system according to claim 3, wherein the controller is configured to: in the shutdown process, control the second inverter and the negative voltage generation circuit to turn off, then control the first inverter and the direct current/direct current conversion circuit to turn off, and finally control the voltage regulation circuit to turn off.

8. The photovoltaic system according to claim 3, wherein the controller is configured to: in the shutdown process, control the first inverter and the second inverter to turn off, then control the negative voltage generation circuit and the direct current/direct current conversion circuit to turn off, and then control the voltage regulation circuit to turn off.

9. The photovoltaic system according to claim 2, wherein the power converter comprises a direct current/direct current conversion circuit and a positive voltage generation circuit;
   an input end of the direct current/direct current conversion circuit is configured to connect to the photovoltaic array, a first output end of the direct current/direct current conversion circuit is connected to the first end of the neutral bus, and a second output end of the direct current/direct current conversion circuit is connected to the first end of the direct current negative bus;
   a first input end of the positive voltage generation circuit is connected to the first output end of the direct current/direct current conversion circuit, a second input end of the positive voltage generation circuit is connected to the second output end of the direct current/direct current conversion circuit, a first output end of the positive voltage generation circuit is connected to the first end of the direct current positive bus, and a second output end of the positive voltage generation circuit is connected to the first end of the neutral bus; and
   the positive voltage generation circuit is configured to convert an output voltage of the direct current/direct current conversion circuit into a positive voltage for output.

10. The photovoltaic system according to claim 9, wherein the controller is configured to: in the startup process, first control the direct current/direct current conversion circuit and the second inverter to turn on, then control the voltage regulation circuit to turn on, then control the positive voltage generation circuit to turn on, and then control the first inverter to turn on.

11. The photovoltaic system according to claim 9, wherein the controller is configured to: in the startup process, first control the direct current/direct current conversion circuit to turn on, then control the voltage regulation circuit to turn on, then control the positive voltage generation circuit to turn on, and then control the first inverter and the second inverter to turn on.

12. The photovoltaic system according to claim 9, wherein the controller is configured to: in the startup process, first control the first inverter to turn on, then control the voltage regulation circuit to turn on, then control the second inverter to turn on, and then control the positive voltage generation circuit and the direct current/direct current conversion circuit to turn on.

13. The photovoltaic system according to claim 9 wherein the controller is configured to: in the shutdown process, first control the first inverter and the positive voltage generation circuit to turn off, then control the second inverter and the direct current/direct current conversion circuit to turn off, and then control the voltage regulation circuit to turn off.

14. The photovoltaic system according to claim 9, wherein the controller is configured to: in the shutdown process, first control the first inverter and the second inverter to turn off, then control the positive voltage generation circuit and the direct current/direct current conversion circuit to turn off, and then control the voltage regulation circuit to turn off.

15. The photovoltaic system according to claim 1, further comprising a discharging circuit, wherein
   the discharging circuit is connected to the direct current positive bus or the direct current negative bus by using a switch; and
   the controller is further configured to: when the voltage to ground of the direct current positive bus, the voltage to ground of the direct current negative bus, or the voltage to ground of the neutral bus is greater than the preset voltage threshold, control the switch to turn on, and control the discharging circuit to discharge.

16. The photovoltaic system according to claim 15, wherein the direct current/direct current conversion circuit in the power converter comprises at least a boost conversion circuit, the discharging circuit is connected to the direct current positive bus, and a first isolating switch is further included:
   the first isolating switch is connected between the boost conversion circuit and the photovoltaic array; and
   the controller is configured to: when the voltage to ground of the direct current positive bus, the voltage to ground of the direct current negative bus, or the voltage to ground of the neutral bus is greater than the preset voltage threshold, control the first isolating switch to turn off, and control the discharging circuit to discharge the direct current positive bus.

17. A control method for a photovoltaic system, wherein the photovoltaic system comprises a first inverter and a second inverter; a first end of a direct current positive bus, a first end of a neutral bus, and a first end of a direct current negative bus are all configured to connect to a photovoltaic array; a first input end of the first inverter is connected to a second end of the direct current positive bus, and a second input end of the first inverter is connected to a second end of the neutral bus; a first input end of the second inverter is connected to the second end of the neutral bus, and a second input end of the second inverter is connected to a second end of the direct current negative bus; and the method comprises:

in startup and shutdown processes of the photovoltaic system, controlling a voltage to ground of the direct current positive bus, a voltage to ground of the direct current negative bus, and a voltage to ground of the neutral bus each to be less than or equal to a preset voltage threshold.

18. The control method according to claim 17, wherein the photovoltaic system further comprises a power converter; an input end of the power converter is configured to connect to the photovoltaic array, a first output end of the power converter is connected to the first end of the direct current positive bus, a second output end of the power converter is connected to the first end of the neutral bus, and a third output end of the power converter is connected to the first end of the direct current negative bus; the photovoltaic system further comprises a voltage regulation circuit connected between ground and any one of the direct current positive bus, the direct current negative bus, the neutral bus, the input end of the power converter, an output end of the first inverter, or an output end of the second inverter; and the power converter comprises a direct current/direct current conversion circuit and a negative voltage generation circuit; and in the startup process, controlling the voltage to ground of the direct current positive bus, the voltage to ground of the direct current negative bus, and the voltage to ground of the neutral bus each to be less than or equal to a preset voltage threshold comprises:

controlling the direct current/direct current conversion circuit and the first inverter to first turn on, then controlling the voltage regulation circuit to turn on, and then controlling the negative voltage generation circuit to turn on and the second inverter to turn on; or controlling the direct current/direct current conversion circuit to turn on, then controlling the voltage regulation circuit to turn on, then controlling the negative voltage generation circuit to turn on, and then controlling the first inverter and the second inverter to turn on; or controlling the first inverter to turn on, then controlling the voltage regulation circuit to turn on, then controlling the second inverter to turn on, and then controlling the negative voltage generation circuit and the direct current/direct current conversion circuit to turn on.

19. The control method according to claim 18, wherein in the shutdown process, controlling the voltage to ground of the direct current positive bus, the voltage to ground of the direct current negative bus, and the voltage to ground of the neutral bus each to be less than or equal to a preset voltage threshold comprises:

controlling the second inverter and the negative voltage generation circuit to turn off, then controlling the first inverter and the direct current/direct current conversion circuit to turn off, and then controlling the voltage regulation circuit to turn off; or controlling the first inverter and the second inverter to turn off, then controlling the negative voltage generation circuit and the direct current/direct current conversion circuit to turn off, and then controlling the voltage regulation circuit to turn off.

20. The control method according to claim 17, wherein the photovoltaic system further comprises a voltage regulation circuit connected between ground and any one of the direct current positive bus, the direct current negative bus, the neutral bus, the input end of the power converter, an output end of the first inverter, or an output end of the second inverter; and the power converter comprises a direct current/direct current conversion circuit and a positive voltage generation circuit; and in the startup process, controlling the voltage to ground of the direct current positive bus, a voltage to ground of the direct current negative bus, and a voltage to ground of the neutral bus each to be less than or equal to a preset voltage threshold comprises:

controlling the direct current/direct current conversion circuit and the second inverter to turn on, then controlling the voltage regulation circuit to turn on, then controlling the positive voltage generation circuit to turn on, and then controlling the first inverter to turn on; or controlling the direct current/direct current conversion circuit to turn on, then controlling the voltage regulation circuit to turn on, then controlling the positive voltage generation circuit to turn on, and then controlling the first inverter and the second inverter to turn on; or controlling the first inverter to turn on, then controlling the voltage regulation circuit to turn on, then controlling the second inverter to turn on, and then controlling the positive voltage generation circuit and the direct current/direct current conversion circuit to turn on.

* * * * *